United States Patent
Frizzell et al.

(10) Patent No.: US 11,560,298 B2
(45) Date of Patent: Jan. 24, 2023

(54) ENGINE INSTALLATION SYSTEMS AND RELATED METHODS

(71) Applicant: The Boeing Company, Chicago, IL (US)

(72) Inventors: Matthew James Frizzell, Ballwin, MO (US); Joseph Edward Flach, St. Charles, MO (US); Richard Kurt Wagner, St. Louis, MO (US); Larry Paul Boyer, Warrenton, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/505,500

(22) Filed: Oct. 19, 2021

(65) Prior Publication Data
US 2022/0212908 A1    Jul. 7, 2022

Related U.S. Application Data

(60) Provisional application No. 63/133,920, filed on Jan. 5, 2021.

(51) Int. Cl.
*B66F 9/065* (2006.01)
*B64F 5/50* (2017.01)
*B64F 5/10* (2017.01)

(52) U.S. Cl.
CPC ............. *B66F 9/065* (2013.01); *B64F 5/10* (2017.01); *B64F 5/50* (2017.01)

(58) Field of Classification Search
CPC .... B66F 9/065; B66F 5/04; B66F 3/24; B64F 5/10; B64F 5/50; F01D 25/285; Y10T 29/53991; Y10T 29/53961; Y10T 29/4932
See application file for complete search history.

(56) References Cited

U.S. PATENT DOCUMENTS

| | | | | |
|---|---|---|---|---|
| 4,440,265 A | * | 4/1984 | Spagnoli | B64F 5/50 182/141 |
| 8,851,441 B2 | * | 10/2014 | Acuna | F01D 25/28 206/319 |
| 9,388,709 B2 | * | 7/2016 | Edwards | F01D 25/285 |
| 9,714,585 B2 | * | 7/2017 | Morey | F01D 25/285 |
| 10,040,579 B1 | * | 8/2018 | Henderson | B65D 19/44 |
| 10,071,450 B2 | * | 9/2018 | Gerber | B23P 19/042 |
| 10,550,728 B2 | * | 2/2020 | Dervaux | B64F 5/50 |

(Continued)

*Primary Examiner* — Lawrence Averick
(74) *Attorney, Agent, or Firm* — Kolitch Romano Dascenzo Gates LLC

(57) ABSTRACT

Engine installation systems and related methods. An engine installation system includes an adapter cradle and a transport dolly. The adapter cradle is configured to support the engine, and the transport dolly is configured to be selectively and operatively coupled to the adapter cradle to support the adapter cradle to facilitate transporting the adapter cradle and the engine across a ground surface. The adapter cradle is configured to be selectively coupled to each of the transport dolly and the vehicle. The adapter cradle is configured to pivot relative to the transport dolly or relative to the vehicle to transition between a transport configuration and an upright configuration. In examples, methods of installing an engine within an engine bay of a vehicle include positioning the engine beneath the engine bay, pivoting the engine relative to the vehicle, and lifting the engine into the engine bay.

27 Claims, 13 Drawing Sheets

(56) References Cited

U.S. PATENT DOCUMENTS

| | | | |
|---|---|---|---|
| 2013/0306830 A1* | 11/2013 | Acuna | F01D 25/28 280/400 |
| 2015/0316197 A1* | 11/2015 | Morey | B62B 3/001 248/556 |
| 2018/0142576 A1* | 5/2018 | Dervaux | F01D 25/285 |

* cited by examiner

ENGINE INSTALLATION SYSTEMS AND RELATED METHODS

RELATED APPLICATION

The present application is a non-provisional of and claims priority to U.S. Provisional Patent Application No. 63/133,920, filed on Jan. 5, 2021, entitled "ENGINE INSTALLATION SYSTEMS AND RELATED METHODS," the complete disclosure of which is incorporated by reference.

GOVERNMENT RIGHTS

This invention was made with Government support under Government Contract N00019-18-C-1012 awarded by the Department of Defense. The Government has certain rights to this invention.

FIELD

The present disclosure relates to engine installation systems and related methods.

BACKGROUND

Configuring aircraft engines to exhibit large diameters may offer performance and/or efficiency gains, but also may introduce challenges for installing the engine into the aircraft. For example, some installations require that the engine be placed underneath an engine bay of the aircraft and lifted into the engine bay, such as with a hydraulic lifting trailer. In some cases, however, a height of the engine in its installed orientation may preclude the engine from being positioned underneath the engine bay in such an orientation and on a hydraulic lifting trailer without increasing a vertical clearance underneath the aircraft, such as by raising the aircraft.

SUMMARY

Engine installation systems and related methods are disclosed herein. An engine installation system for installing an engine within an engine bay of a vehicle includes an adapter cradle and a transport dolly. The adapter cradle is configured to be selectively and operatively coupled to the engine to support the engine, and the transport dolly is configured to be selectively and operatively coupled to the adapter cradle to support the adapter cradle to facilitate transporting the adapter cradle and the engine across a ground surface. The adapter cradle is configured to be selectively coupled to each of the transport dolly and the vehicle. The engine installation system is configured such that, when the adapter cradle is operatively coupled to the transport dolly, the adapter cradle is configured to pivot relative to the transport dolly about a cradle pivot axis to transition the adapter cradle among a plurality of configurations defined between and including a transport configuration and an upright configuration. The engine installation system also is configured such that, when the adapter cradle is operatively coupled to the vehicle, the adapter cradle is configured to pivot relative to the vehicle about a hinge fitting pivot axis to transition the adapter cradle among the plurality of configurations defined between and including the transport configuration and the upright configuration.

Methods of installing an engine within an engine bay of a vehicle include positioning the engine beneath the engine bay, pivoting the engine relative to the vehicle, and lifting the engine into the engine bay. In various examples, methods of installing an engine within an engine bay of a vehicle are performed, at least in part, utilizing an engine installation system as described herein.

DESCRIPTION

Figure 1:
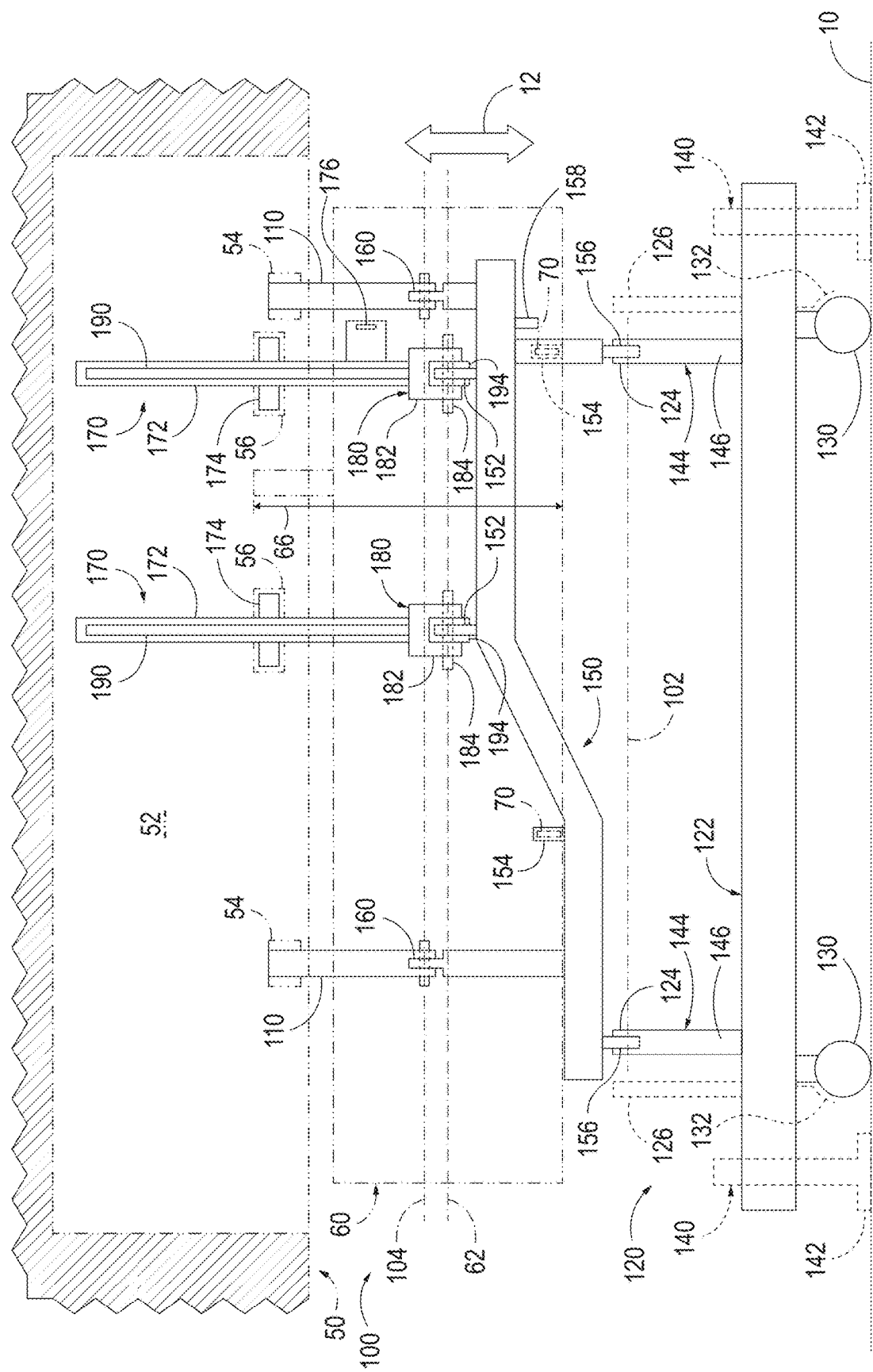
FIG. 1 is a schematic side elevation view illustrating examples of engine installation systems according to the present disclosure.

FIGS. 1-17 provide illustrative, non-exclusive examples of engine installation systems 100 for installing an engine 60 within an engine bay 52 of a vehicle 50 and/or of methods 200 of installing an engine 60 within an engine bay 52 of a vehicle 50, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure. Additionally, in some Figures, one or more components and/or portions thereof that are obscured from view also may be illustrated in dashed lines.

Figure 2:
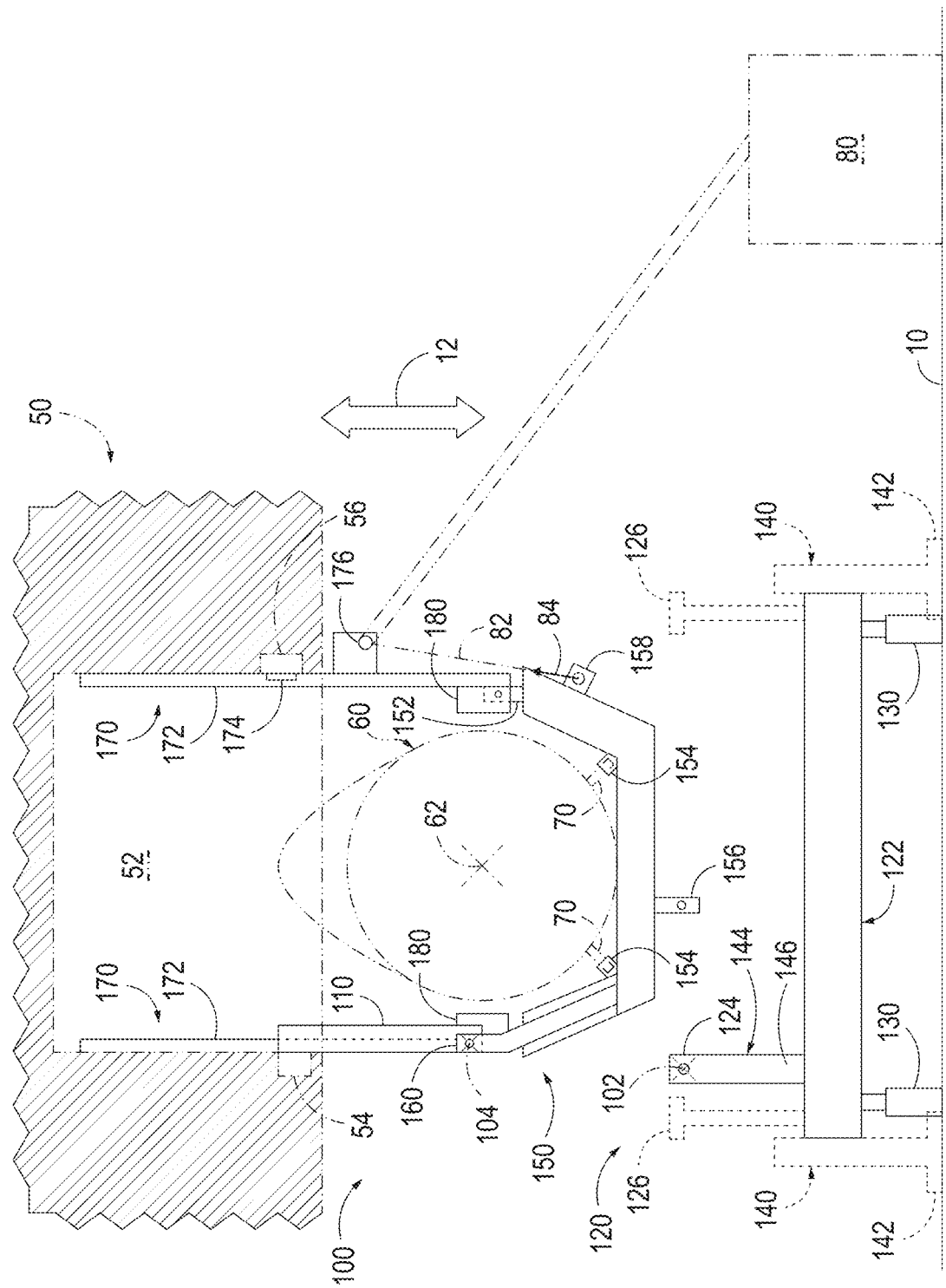
FIG. 2 is a schematic front elevation view illustrating examples of engine installation systems according to the present disclosure.

FIGS. 1-2 schematically illustrate examples of engine installation systems 100 according to the present disclosure, while FIGS. 3-16 are less schematic illustrations of examples of engine installation systems 100, including examples of engine installation systems 100 during operative use to install an engine 60 within an engine bay 52 of a vehicle 50. As schematically illustrated in FIGS. 1-2, an engine installation system 100 for installing an engine 60 within an engine bay 52 of a vehicle 50 includes an adapter cradle 150 configured to be selectively and operatively coupled to engine 60 to support engine 60 and a transport dolly 120 configured to be selectively and operatively coupled to adapter cradle 150 to support adapter cradle 150. In particular, transport dolly 120 is configured to support adapter cradle 150 to facilitate transporting adapter cradle 150 and engine 60 across a ground surface 10.

As described in more detail herein, during operative use of engine installation system 100, adapter cradle 150 is configured to be selectively coupled to each of transport dolly 120 and to vehicle 50 and to pivot relative to each of transport dolly 120 and vehicle 50. More specifically, and as illustrated in FIGS. 3-6, when adapter cradle 150 is operatively coupled to transport dolly 120, adapter cradle 150 is configured to pivot relative to transport dolly 120 about a cradle pivot axis 102 to transition adapter cradle 150 among a plurality of configurations defined between and including a transport configuration (illustrated in FIGS. 5-6) and an upright configuration (illustrated in FIGS. 3-4). When adapter cradle 150 is operatively coupled to vehicle 50, and as schematically illustrated in FIGS. 1-2 and less schematically illustrated in FIGS. 13-14, adapter cradle 150 is configured to pivot relative to vehicle 50 about a hinge fitting pivot axis 104 to transition adapter cradle 150 among the plurality of configurations defined between and including the transport configuration (illustrated in FIG. 13) and the upright configuration (illustrated in FIGS. 1-2 and 14). In this manner, the identification of the configuration of adapter cradle 150 (e.g., the transport configuration, the upright configuration, and/or any of the plurality of configurations therebetween) is intended to indicate a rotational orientation of adapter cradle 150 relative to cradle pivot axis 102 and/or hinge fitting pivot axis 104 and does not require or imply that adapter cradle 150 is operatively coupled to engine 60, to transport dolly 120, and/or to vehicle 50.

In various examples, during operative use of engine installation system 100, adapter cradle 150 is configured to be operatively coupled to engine 60 such that a rotational orientation of adapter cradle 150 corresponds to a rotational orientation of engine 60. In particular, in various examples, engine installation system 100 is configured such that, when engine 60 is operatively coupled to adapter cradle 150, adapter cradle 150 is configured to pivot engine 60 about cradle pivot axis 102 and/or about hinge fitting pivot axis 104 to transition engine 60 among a plurality of rotational orientations. More specifically, adapter cradle 150 is configured to transition engine 60 among a plurality of orientations defined between and including a transport orientation (illustrated in FIGS. 5-6 and 13) and an installation orientation (schematically illustrated in FIGS. 1-2 and less schematically illustrated at least in FIGS. 4 and 14-16). In particular, when engine 60 is operatively coupled to adapter cradle 150, engine 60 is in the transport orientation when adapter cradle 150 is in the transport configuration, and engine 60 is in the installation orientation when adapter cradle 150 is in the upright configuration. In this manner, engine installation system 100 may be described as operating to pivot and/or rotate engine 60, such as about cradle pivot axis 102 and/or hinge fitting pivot axis 104. In particular, and as schematically illustrated in FIGS. 1-2, engine installation system 100 may be configured such that cradle pivot axis 102 and hinge fitting pivot axis 104 each are at least substantially parallel to a longitudinal axis 62 of engine 60.

Engine installation system 100 may be configured such that adapter cradle 150 and/or engine 60 rotates and/or pivots through any of a variety of angles as adapter cradle 150 transitions between the transport configuration and the upright configuration. More specifically, in various examples, adapter cradle 150 is configured to pivot relative to transport dolly 120 about cradle pivot axis 102, and/or to pivot relative to vehicle 50 about hinge fitting pivot axis 104, through an angle that is at least 40 degrees, at least 60 degrees, at least 80 degrees, at most 100 degrees, at most 90 degrees, at most 70 degrees, and/or at most 50 degrees, as adapter cradle 150 transitions between the transport configuration and the upright configuration.

Figure 5:
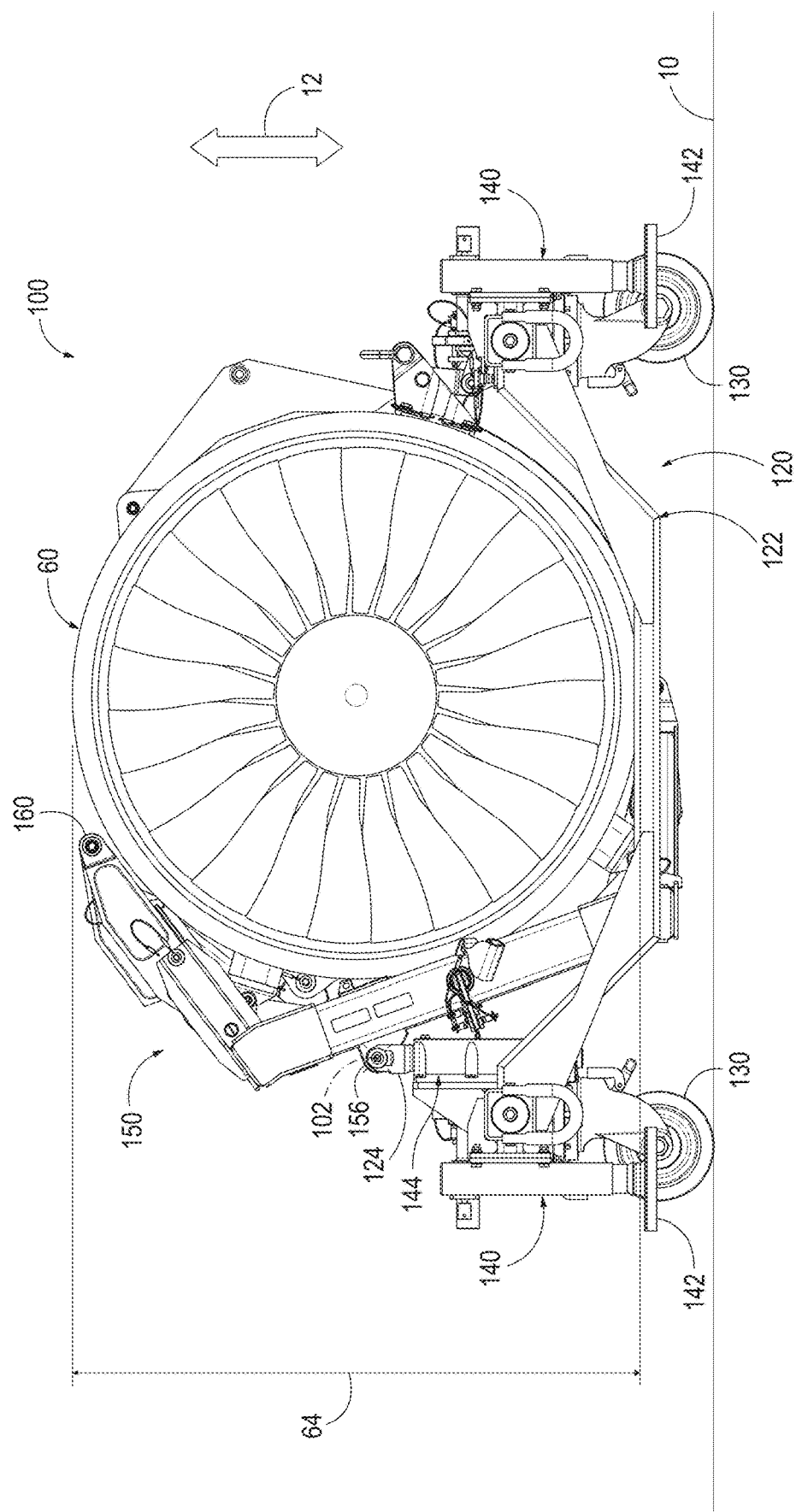
FIG. 5 is a front elevation view of the portion of the engine installation system of FIGS. 3-4 with the adapter cradle in a transport configuration and in a lowered position according to the present disclosure.

As described in more detail herein, engine installation system 100 generally is configured to facilitate installation of engine 60 within engine bay 52 of vehicle 50 via sequential rotation and lifting of engine 60. In particular, engine installation systems 100 according to the present disclosure generally pertain to applications in which engine 60 is inserted into engine bay 52 from below, such as by lifting engine 60 into engine bay 52. In some such examples, vehicle 50 and/or engine 60 may be dimensioned such that a height of engine 60 in the installation orientation precludes transporting engine 60 to a location underneath engine bay 52 while engine 60 is in the installation orientation without raising engine bay 52 and/or another component of vehicle 50 relative to ground surface 10. More specifically, and as illustrated in FIG. 5, engine 60 may be described as having a transportation vertical dimension 64, as measured along a direction parallel to a vertical direction 12 when engine 60 is in the transport orientation. As schematically illustrated in FIGS. 1-2 and less schematically illustrated in FIG. 3, engine 60 also may be described as having an upright vertical dimension 66, as measured along a direction parallel to vertical direction 12 when engine 60 is in the installation orientation, such that upright vertical dimension 66 is greater than transportation vertical dimension 64. Accordingly, engine installation system 100 is configured to transport engine 60 across ground surface 10 with engine 60 in the transport orientation to facilitate placing engine 60 underneath engine bay 52 even when vehicle 50 offers limited vertical clearance underneath and/or in the vicinity of engine bay 52. Subsequent to positioning engine 60 underneath engine bay 52 with transport dolly 120 and adapter cradle 150, engine installation system 100 then may be utilized to rotate engine 60 to the installation orientation such that engine 60 may be operatively installed within engine bay 52, as described herein. Vehicle 50 may include and/or be any of a variety of vehicles, examples of which include an aircraft, a fixed-wing aircraft, a rotorcraft, a spacecraft, and/or a marine vehicle.

As used herein, the terms "operative use," "operatively utilized," and the like, as used to describe a state or application of engine installation system 100, are intended to refer to examples and/or instances in which engine installation system 100 is being operatively utilized to install engine 60 within engine bay 52 of vehicle 50, as described herein. As examples, engine installation system 100 may be described as being operatively utilized, and/or as being in operative use, when adapter cradle 150 is operatively coupled to engine 60, to vehicle 50, to engine bay 52, and/or to any other component of engine installation system 100, such as in a manner described herein. However, such descriptions are not limiting, and it is additionally within the scope of the present disclosure that any descriptions of features, characteristics, functionalities, etc. of a component during operative use of engine installation system 100 do not limit the subject matter of the present disclosure to examples in which such components are actively being utilized. For example, while the present disclosure generally is directed to examples in which engine installation systems 100 and/or various components thereof are operatively coupled to vehicle 50 and/or to engine 60, such descriptions are not intended to imply that engine installation systems 100 and/or the corresponding components are inventive, or are encompassed by the present disclosure, only during operative use thereof.

In some examples, and as described herein, adapter cradle 150 is configured to be operatively coupled to each of transport dolly 120 and vehicle 50 at least partially concurrently and/or at least partially sequentially during operative use of engine installation system 100. Stated differently, and as described in more detail herein, in some examples, engine installation system 100 is configured such that adapter cradle 150 is sequentially operatively coupled to transport dolly 120 (but not vehicle 50), to both transport dolly 120 and vehicle 50, and to vehicle 50 (but not transport dolly 120), while adapter cradle 150 operatively supports engine 60. In this manner, and as described herein, adapter cradle 150 may be described as operatively transferring engine 60 from being operatively supported by transport dolly 120 to being operatively supported by vehicle 50.

Figure 12:
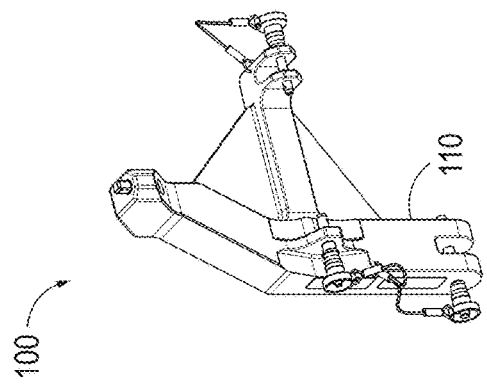
FIG. 12 is a rear top side isometric view of an example of a hinge fitting of an engine installation system according to the present disclosure.
Figure 11:
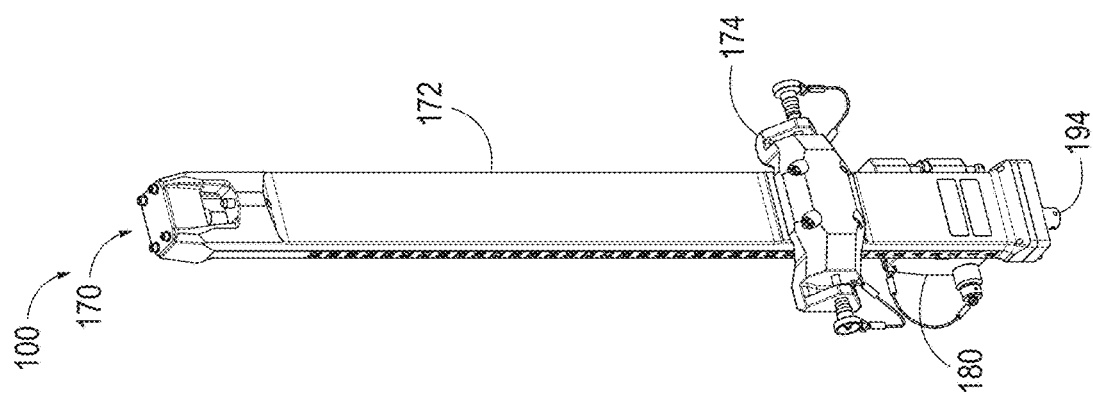
FIG. 11 is a rear top side isometric view of another example of a lifting rail assembly of an engine installation system according to the present disclosure.
Figure 10:
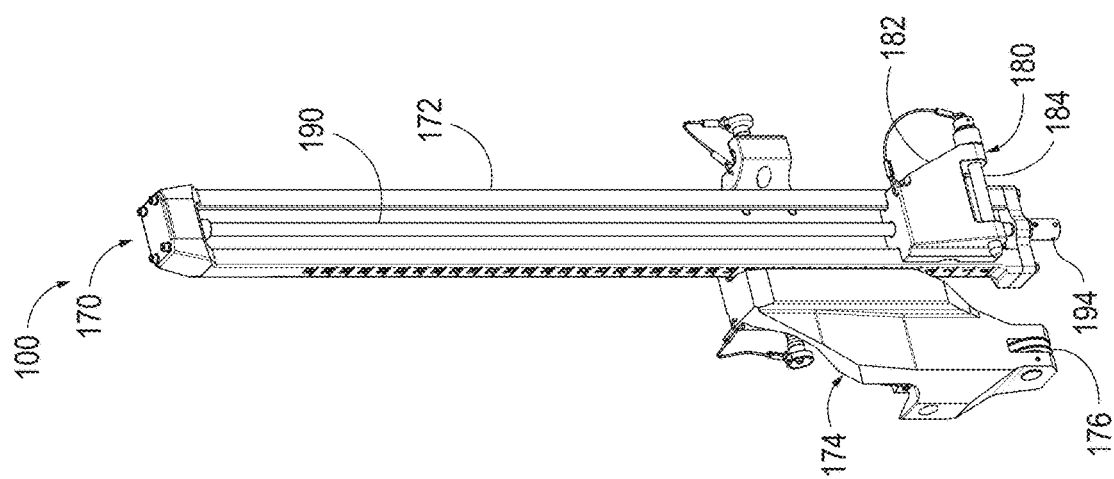
FIG. 10 is a front top side isometric view of an example of a lifting rail assembly of an engine installation system including a lifting apparatus support according to the present disclosure.
Figure 13:
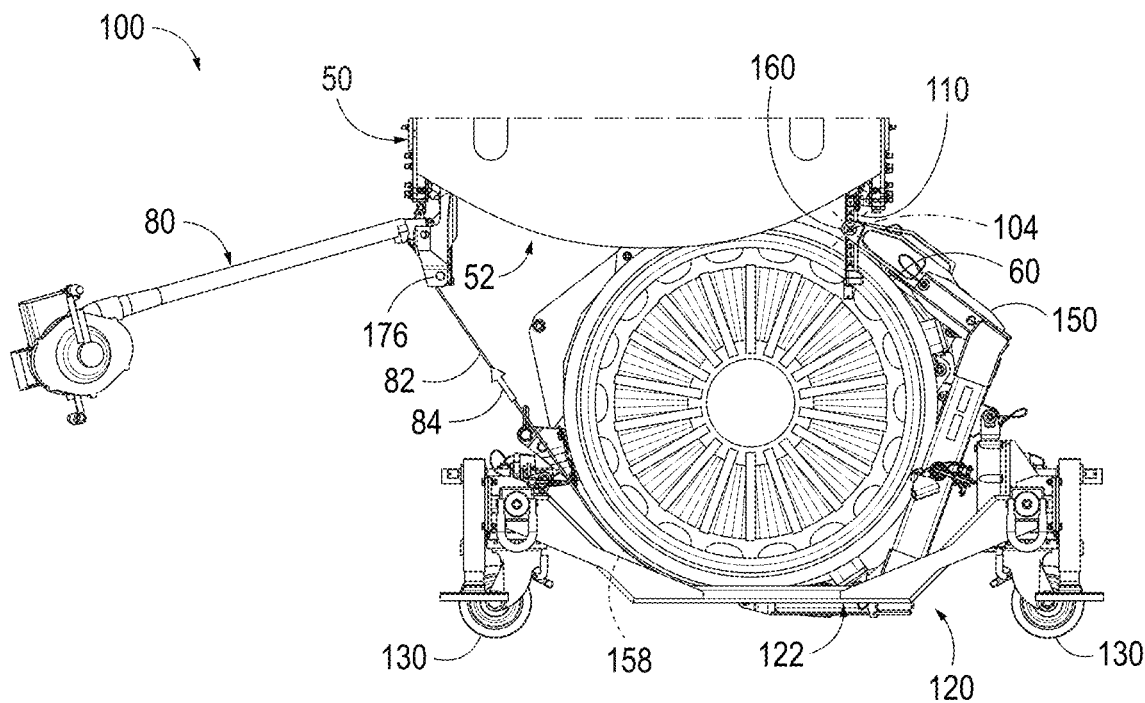
FIG. 13 is a rear elevation view of an example of a portion of an engine installation system with an adapter cradle operatively coupled to an engine and to a transport dolly and in a transport configuration, with the adapter cradle operatively coupled to a lifting apparatus, according to the present disclosure.
Figure 14:
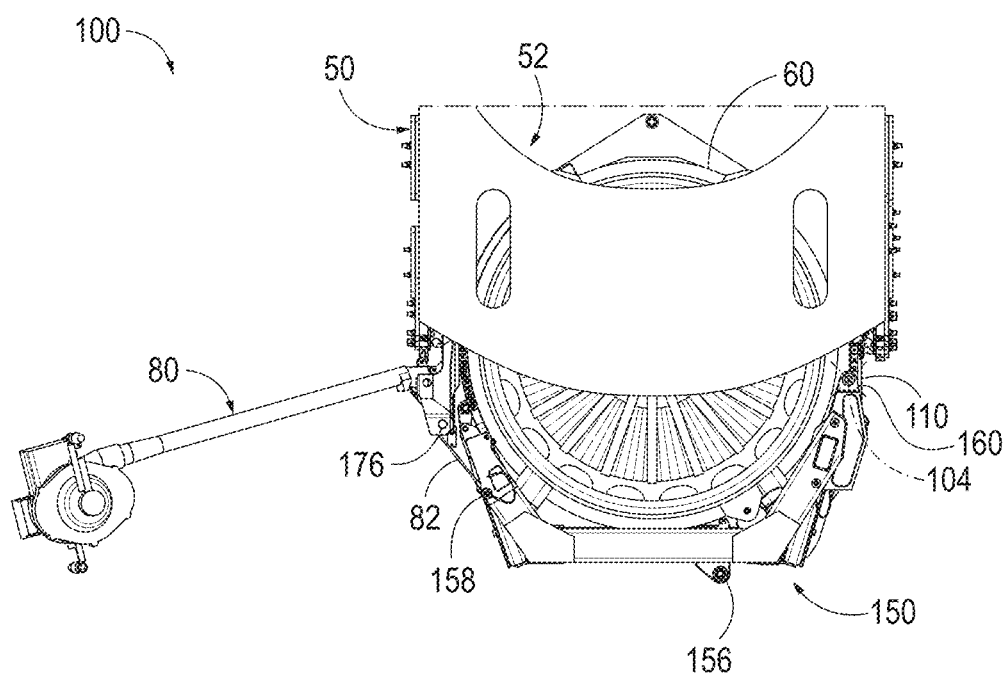
FIG. 14 is a rear elevation view of the portion of the engine installation system of FIG. 13 with the adapter cradle removed from the transport dolly and in the upright configuration and with the engine in an installation orientation according to the present disclosure.
Figure 15:
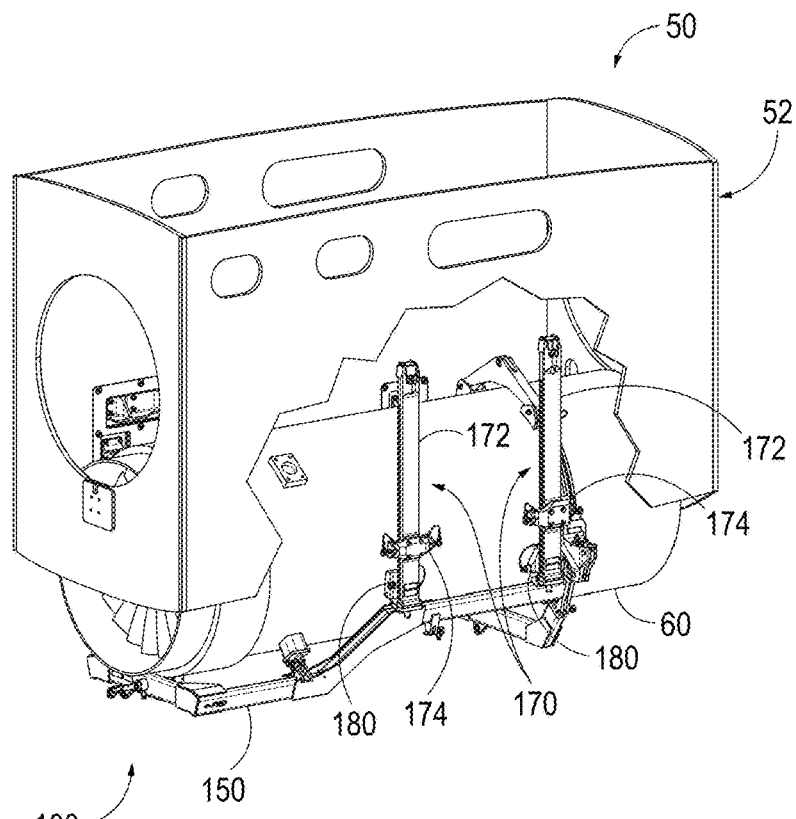
FIG. 15 is a front top side isometric cutaway view of an example of an adapter cradle of an engine installation system operatively coupled to an engine and to a plurality of lifting rail assemblies in a lowered position according to the present disclosure.
Figure 16:
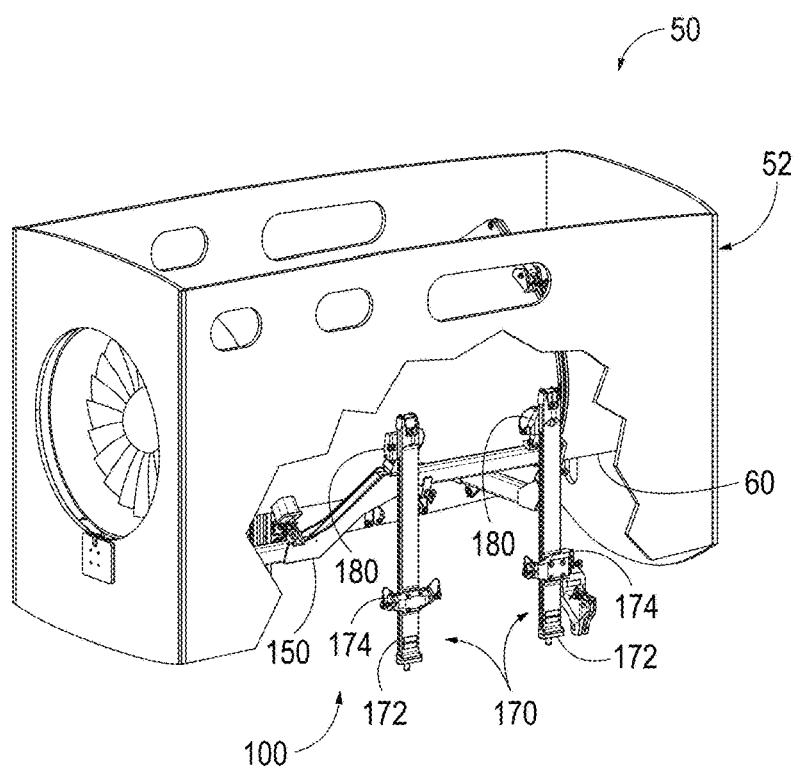
FIG. 16 is a front top side isometric cutaway view of the adapter cradle and lifting rail assemblies of FIG. 15 in a raised position according to the present disclosure.

In various examples, and as schematically illustrated in FIGS. 1-2, engine installation system 100 additionally includes a plurality of lifting rail assemblies 170 configured to be selectively and operatively coupled to adapter cradle 150 to support adapter cradle 150 relative to vehicle 50 and to translate adapter cradle 150 into and out of engine bay 52 along a direction at least substantially parallel to vertical direction 12. Additionally, in various examples, and as schematically illustrated in FIGS. 1-2, engine installation system 100 includes a plurality of hinge fittings 110 configured to be selectively mounted to vehicle 50 and configured to be selectively and pivotally coupled to adapter cradle 150. In such examples, and as schematically illustrated in FIGS. 1-2, adapter cradle 150 is configured to be selectively and operatively coupled to vehicle 50 via the plurality of lifting rail assemblies 170 and/or via the plurality of hinge fittings 110 during operative use of engine installation system 100. In particular, in some examples, as schematically illustrated in FIGS. 1-2 and as described in more detail herein, adapter cradle 150 is configured to be selectively and operatively coupled to the plurality of lifting rail assemblies 170 while adapter cradle 150 is operatively coupled to the plurality of hinge fittings 110 and when adapter cradle 150 is in the upright configuration. In some such examples, and as schematically illustrated in FIGS. 1-2, each hinge fitting 110 is configured to be mounted at a respective hinge fitting mount location 54 within engine bay 52 during operative use of engine installation system 100. FIGS. 10-11 provide less schematic illustrations of lifting rail assemblies 170, while FIG. 12 illustrates an example of a hinge fitting 110. Additionally, FIGS. 13-14 illustrate examples in which adapter cradle 150 is operatively coupled to the plurality of hinge fittings 110 (one of which is visible in FIGS. 13-14), and FIGS. 15-16 illustrate examples in which adapter cradle 150 is operatively coupled to the plurality of lifting rail assemblies 170.

As used herein, the term "vertical," as used to describe a direction, a dimension, an orientation, etc. is intended to refer to a direction that is parallel to a direction of a force of gravity and/or that is perpendicular to ground surface 10. However, such descriptions are not limited to examples in which ground surface 10 is perfectly level and/or perpendicular to the direction of the force of gravity. As an example, vertical direction 12 may be described as extending perpendicular to ground surface 10 and/or to a portion thereof even when ground surface 10 is uneven, tilted, and/or otherwise does not extend entirely and/or perfectly perpendicular to the direction of the force of gravity. Additionally, as used herein, a component, path, etc. may be described as moving and/or extending vertically, and/or in a vertical direction, when the component, path, etc. moves and/or extends along a direction at least substantially parallel to vertical direction 12, even in examples in which such motion and/or extent is not perfectly parallel to vertical direction 12.

Transport dolly 120 may have any of a variety of components and/or configurations for operatively supporting and/or transporting adapter cradle 150 as described herein. In some examples, and as schematically illustrated in FIGS. 1-2 and less schematically illustrated at least in FIGS. 3-7, transport dolly 120 includes a dolly frame 122 configured to support adapter cradle 150 (shown in FIGS. 1-6) and/or a plurality of casters 130 operatively coupled to dolly frame 122 to facilitate transporting transport dolly 120 across ground surface 10. While the present disclosure generally relates to examples in which transport dolly 120 includes casters 130, this is not required of all examples of transport dolly 120, and it is additionally within the scope of the present disclosure that transport dolly 120 may include any suitable components and/or mechanisms for transporting adapter cradle 150, such as wheels, rollers, etc.

In some examples, and as schematically illustrated in FIGS. 1-2 and less schematically illustrated at least in FIGS. 3-6, transport dolly 120 and/or dolly frame 122 includes a plurality of adapter cradle mounts 124, and adapter cradle 150 includes a corresponding plurality of dolly interfaces 156. In such examples, each dolly interface 156 is configured to be selectively coupled to a corresponding adapter cradle mount 124 to pivotally couple adapter cradle 150 to transport dolly 120. In particular, in some such examples, and as illustrated at least in FIGS. 3-6 and 9, the plurality of adapter cradle mounts 124 and the plurality of dolly interfaces 156 each are distributed along cradle pivot axis 102 when adapter cradle 150 is operatively coupled to transport dolly 120. In some examples, each dolly interface 156 is configured to be selectively uncoupled from the corresponding adapter cradle mount 124 to selectively uncouple adapter cradle 150 from transport dolly 120 during operative use of engine installation system 100. Adapter cradle mount 124 and dolly interface 156 each may include and/or be any of a variety of structures for operatively and pivotally coupling adapter cradle 150 to transport dolly 120 as described herein, examples of which include a pin, a ball lock pin, a pin receiver, a clevis fastener, a clevis, a clevis pin, a tang, a latch, a hook, a hinge, and/or a bolt. In the examples of FIGS. 1-9, dolly frame 122 includes two adapter cradle mounts 124 (shown at least in FIGS. 1,7, and 9), and adapter cradle 150 includes two corresponding dolly interfaces 156 (shown at least in FIGS. 1 and 8).

Transport dolly 120 also may have any of a variety of features and/or components for facilitating moving transport dolly 120 across ground surface 10 and/or for maintaining transport dolly 120 in a particular position (e.g., underneath engine bay 52). In some examples, and as schematically illustrated in FIGS. 1-2 and less schematically illustrated at least in FIG. 7, transport dolly 120 includes one or more transport handles 126 operatively coupled to dolly frame 122 and configured to be gripped by a user to facilitate transporting transport dolly 120 across ground surface 10, such as by pushing or pulling each transport handle 126.

Figure 7:
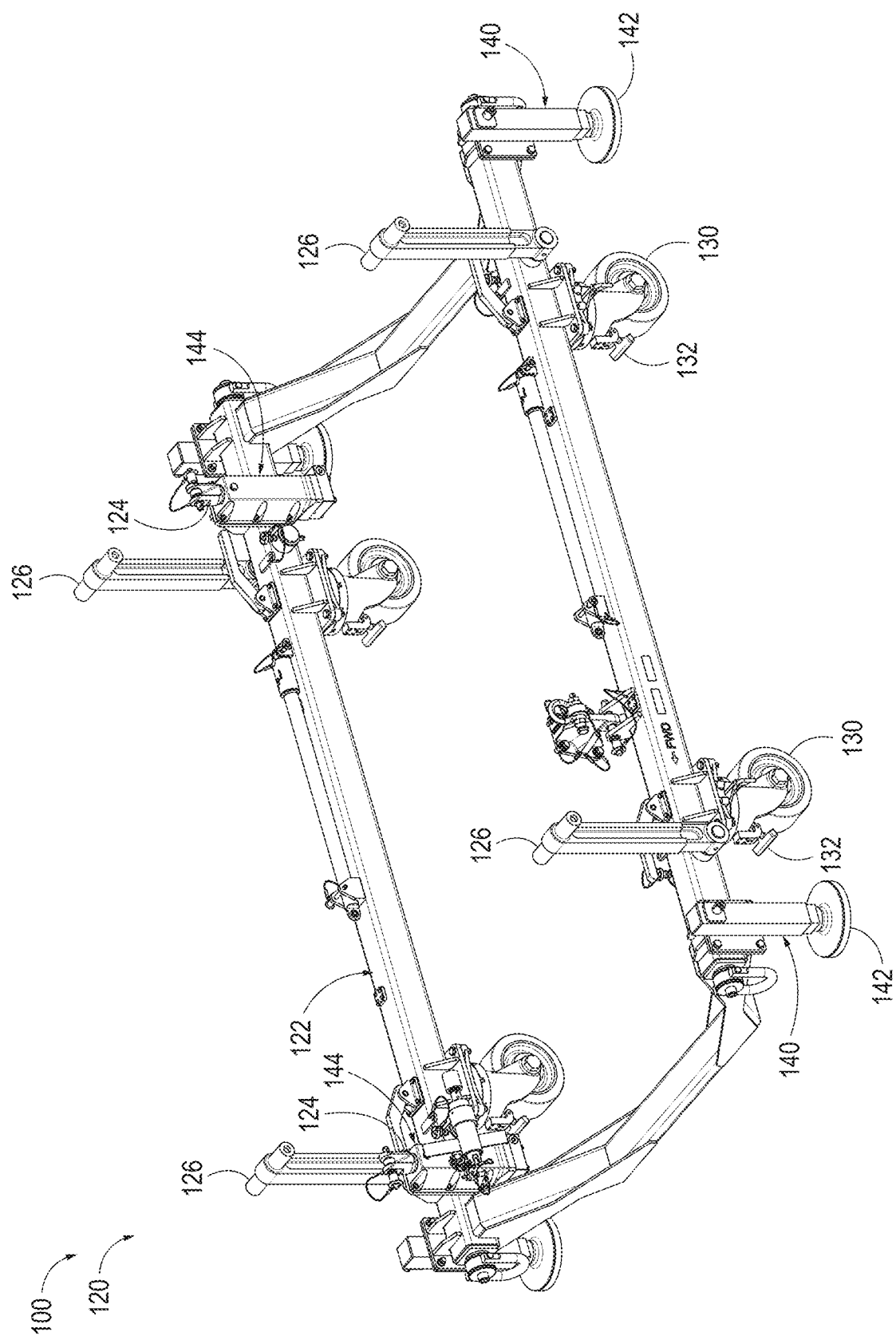
FIG. 7 is a front top side isometric view of the transport dolly of FIGS. 3-6.
Figure 8:
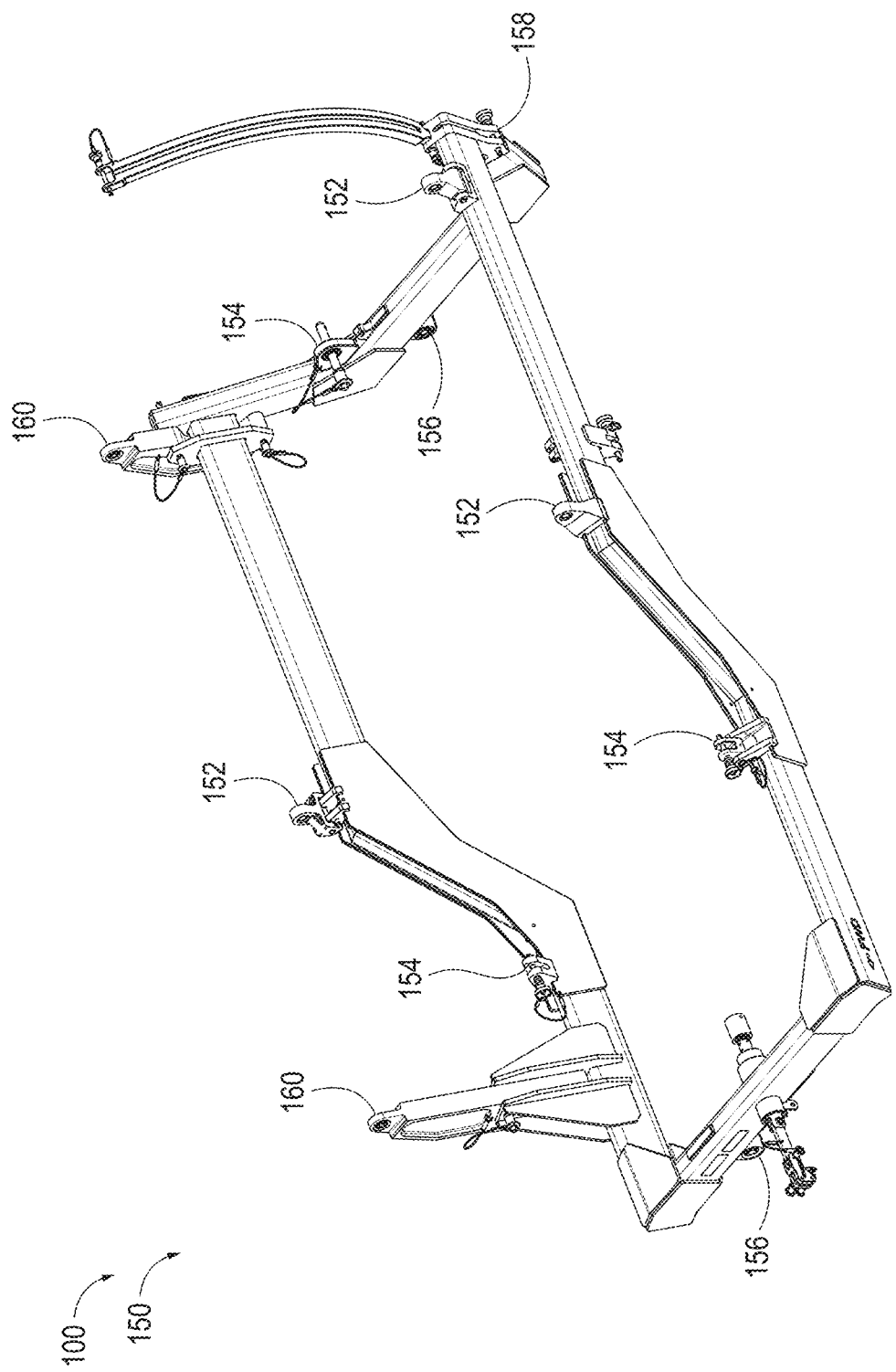
FIG. 8 is a front top side isometric view of the adapter cradle of FIGS. 3-7.
Figure 9:
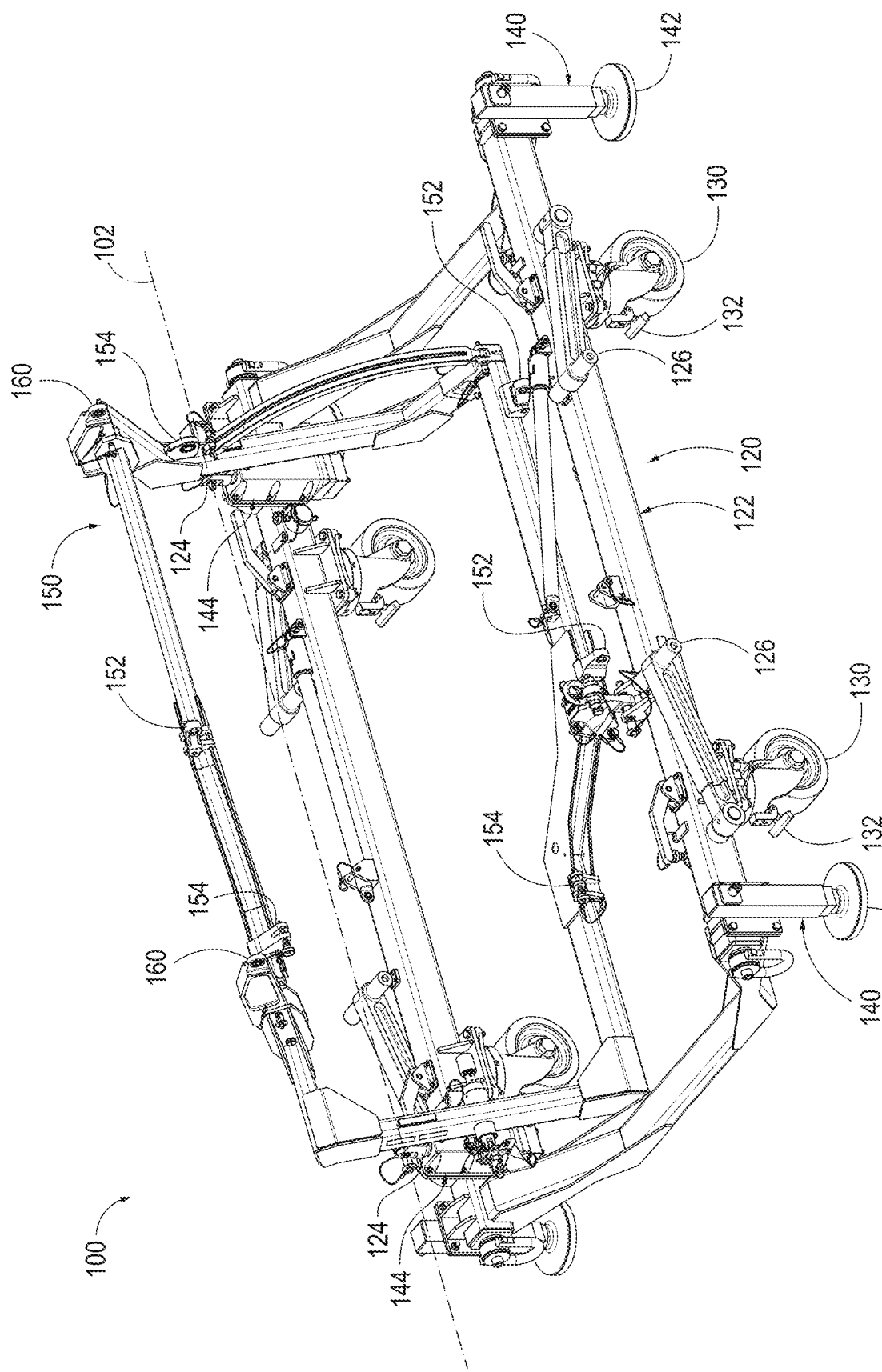
FIG. 9 is a front top side isometric view of the adapter cradle of FIGS. 3-6 and 8 operatively coupled to the transport dolly of FIGS. 3-7 and in the transport configuration.

Additionally or alternatively, in some examples, and as schematically illustrated in FIGS. 1-2 and less schematically illustrated at least in FIG. 7, transport dolly 120 includes one or more caster brakes 132 configured to selectively restrict one or more corresponding casters 130 from facilitating transporting transport dolly 120 across ground surface 10. For example, each caster brake 132 may be configured to selectively engage and/or lock each corresponding caster 130 to restrict the corresponding caster(s) 130 from rotating.

Additionally or alternatively, in some examples, and as schematically illustrated in FIGS. 1-2 and less schematically illustrated at least in FIG. 7, transport dolly 120 includes one or more stability jacks 140 configured to selectively retain transport dolly 120 in place relative to ground surface 10. In some such examples, each stability jack 140 includes a stabilizer pad 142 configured to selectively engage ground surface 10. In particular, in some such examples, stability jack 140 and/or stabilizer pad 142 is configured to engage ground surface 10 in a manner that restricts transport dolly 120 from moving along ground surface 10, such as by raising dolly frame 122 such that casters 130 are lifted off of ground surface 10.

Figure 6:
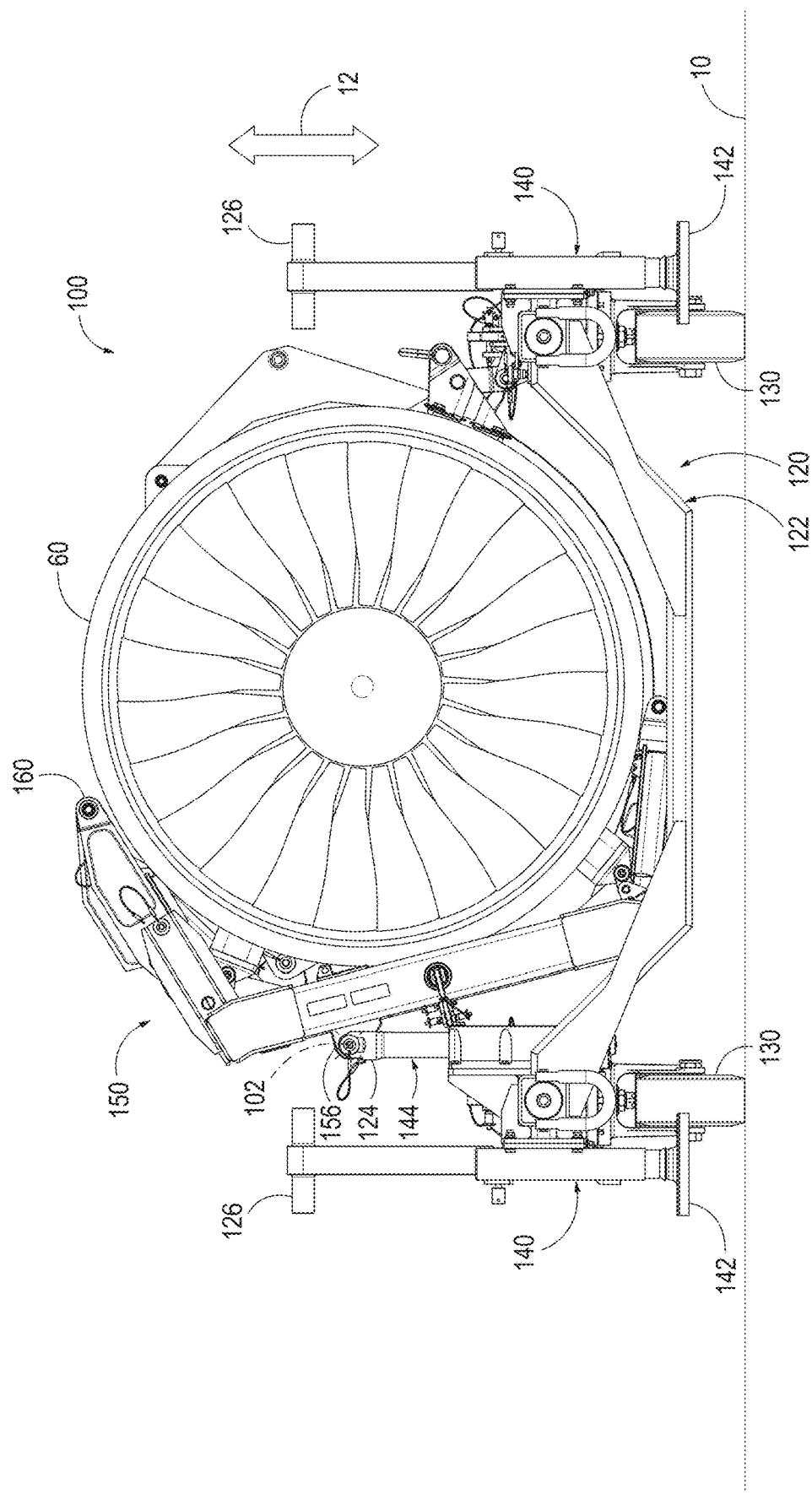
FIG. 6 is a front elevation view of the portion of the engine installation system of FIGS. 3-5 with the adapter cradle in the transport configuration and in a raised position according to the present disclosure.

Additionally or alternatively, in some examples, and as schematically illustrated in FIGS. 1-2 and less schematically illustrated at least in FIGS. 5-7, transport dolly 120 includes a plurality of adapter cradle lifting members 144 configured to selectively adjust an orientation and/or a vertical height of adapter cradle 150 relative to ground surface 10 and/or relative to dolly frame 122. In some such examples, each adapter cradle mount 124 is operatively coupled to a corresponding adapter cradle lifting member 144, and/or each adapter cradle lifting member 144 includes and/or supports a corresponding adapter cradle mount 124. In such examples, each adapter cradle lifting member 144 is configured to be independently transitioned among a plurality of vertical positions defined between and including a lowered position (shown in FIGS. 1-2 and 5) and a raised position (shown in FIG. 6) to adjust a vertical position of the corresponding adapter cradle mount 124 relative to dolly frame 122, thereby adjusting a vertical position of the dolly interface 156 that is operatively coupled to the corresponding adapter cradle mount 124 when adapter cradle 150 is operatively coupled to transport dolly 120. In particular, in such examples, when each adapter cradle lifting member 144 is in the lowered position, the corresponding adapter cradle mount 124 is proximate to ground surface 10, and when each adapter cradle lifting member 144 is in the raised position, the corresponding adapter cradle mount 124 is distal to ground surface 10. In this manner, selectively adjusting the vertical position of each adapter cradle lifting member 144 may enable and/or facilitate vertically positioning and/or aligning adapter cradle 150 relative to hinge fittings 110, lifting rail assemblies 170, and/or engine bay 52. For example, when adapter cradle 150 is operatively coupled to transport dolly 120 with engine 60 operatively coupled to adapter cradle 150, engine 60 may be described as being supported by a four-bar linkage system with two couplings between adapter cradle mounts 124 and respective dolly interfaces 156 that are vertically adjustable via corresponding adapter cradle lifting members 144. Accordingly, in such examples, selective adjustment of the vertical position of each adapter cradle mount 124 via the corresponding adapter cradle lifting members 144 enables selective adjustment of a vertical height and/or a pitch angle of adapter cradle 150 and/or of engine 60, such as to position adapter cradle 150 relative to engine bay 52 such that adapter cradle 150 may be operatively coupled to hinge fittings 110.

Each adapter cradle lifting member 144 may include and/or be any of a variety of mechanisms for selectively adjusting the vertical position of the corresponding adapter cradle mount 124, examples of which include a mechanical actuator, a screw, a leadscrew, a gear, a rack and pinion assembly, a ratchet mechanism, a lift cylinder, a hydraulic lifting actuator, a pneumatic lifting actuator, etc. In some examples, each adapter cradle lifting member 144 is configured to be manually actuated. In particular, and as schematically illustrated in FIGS. 1-2 and less schematically illustrated at least in FIG. 3, each adapter cradle lifting member 144 includes a lifting member drive input 146 configured to receive an input force and/or torque for actuating the respective adapter cradle lifting member 144. In some such examples, lifting member drive input 146 includes, or is configured to receive a torque from, a crank, such as a manually operated crank.

Each lifting rail assembly 170 may have any of a variety of features and/or components for operatively supporting and translating adapter cradle 150 as described herein. In some examples, and as schematically illustrated in FIGS. 1-2 and less schematically illustrated in FIGS. 10-11, each lifting rail assembly 170 includes a respective lifting rail 172 configured to be supported by engine bay 52 (shown in FIGS. 1-2) during operative use of engine installation system 100 and a respective adapter mount subassembly 180 operatively coupled to the respective lifting rail 172. In such examples, each adapter mount subassembly 180 is configured to be selectively coupled to adapter cradle 150 to support adapter cradle 150 upon the plurality of lifting rail assemblies 170. Additionally, in such examples, each respective adapter mount subassembly 180 is configured to translate relative to, and along, the respective lifting rail 172 to translate adapter cradle 150 in the direction at least substantially parallel to vertical direction 12.

Each lifting rail assembly 170 may include and/or utilize any of a variety of mechanisms for translating the respective adapter mount subassembly 180 relative to the respective lifting rail 172. In some examples, and as schematically illustrated in FIG. 1 and less schematically illustrated in FIG. 10, each lifting rail assembly 170 includes a respective lifting actuator 190 operatively coupled to each of the respective lifting rail 172 and the respective adapter mount subassembly 180 and configured to selectively translate the respective adapter mount subassembly 180 relative to the respective lifting rail 172. Lifting actuator 190 may include and/or be any of a variety of mechanisms, examples of which include a screw, a leadscrew, a gear, a rack and pinion assembly, a ratchet mechanism. etc. In some examples, lifting actuator 190 is configured to be manually actuated. In some examples, configuring engine installation system 100 such that lifting actuator 190 is a mechanical and/or a manually actuated lifting actuator provides safety benefits over analogous systems that utilize fluid pressure, such as hydraulic pressure, to lift engine 60. In particular, whereas a fluid-based lifting device may exhibit adverse performance characteristics due to fluid leaks, a mechanical lifting device such as lifting actuator 190 including a leadscrew may be left unattended in a partially raised state with a reduced risk of an inadvertent lowering of engine 60.

In some examples, and as schematically illustrated in FIG. 1 and less schematically illustrated in FIGS. 10-11, each lifting rail assembly 170 includes a lifting rail drive input 194 configured to receive an input force and/or torque for actuating the respective lifting actuator 190. In some such examples, lifting rail drive input 194 includes, or is configured to receive a torque from, a crank, such as a manually operated crank. In particular, FIG. 10 illustrates an example in which lifting actuator 190 includes a leadscrew that may be selectively rotated relative to each of lifting rail 172 and adapter mount subassembly 180 via a torque applied to lifting rail drive input 194 with a crank. In this example, the leadscrew of lifting actuator 190 engages adapter mount subassembly 180 such that rotation of the leadscrew yields translation of adapter mount subassembly 180 relative to lifting rail 172.

Each lifting rail assembly 170 may be configured to be operatively coupled to engine bay 52 in any of a variety of manners. In some examples, and as schematically illustrated in FIGS. 1-2 and less schematically illustrated in FIGS. 10-11, each lifting rail assembly 170 includes a respective engine bay mount 174 operatively and/or fixedly coupled to the respective lifting rail 172 and configured to be fixedly coupled to a corresponding lifting rail mount location 56 (shown in FIGS. 1-2) of engine bay 52. Engine bay mount 174 may be configured to be operatively coupled to the corresponding lifting rail mount location 56 via any of a variety of mechanisms, examples of which include mechanical fasteners and/or bolts.

Adapter cradle 150 and/or engine 60 each may have any of a variety of features and/or components for operatively coupling adapter cradle 150 to engine 60. In some examples, and as schematically illustrated in FIGS. 1-2 and less schematically illustrated at least in FIGS. 3 and 8, adapter cradle 150 includes a plurality of engine interfaces 154, and engine 60 includes a corresponding plurality of adapter attachment lugs 70 (shown in FIGS. 1-2). In such examples, each engine interface 154 is configured to be selectively coupled to a respective adapter attachment lug 70 to operatively couple engine 60 to adapter cradle 150. Each engine interface 154 may be configured to be selectively coupled to the respective adapter attachment lug 70 via any of a variety of fasteners and/or couplers, examples of which include a pin, a ball lock pin, a mechanical fastener, a clevis fastener, a clevis, a clevis pin, a tang, and/or a bolt.

Additionally, adapter cradle 150 and/or each lifting rail assembly 170 each may have any of a variety of features and/or components for operatively coupling adapter cradle 150 to the plurality of lifting rail assemblies 170. In some examples, and as schematically illustrated in FIGS. 1-2 and less schematically illustrated at least in FIG. 8, adapter cradle 150 includes a plurality of rail interfaces 152, each configured to selectively engage the respective adapter mount subassembly 180 (shown in FIGS. 1-2) of a corresponding lifting rail assembly 170 to selectively couple adapter cradle 150 to the plurality of lifting rail assemblies 170. More specifically, in some such examples, and as schematically illustrated in FIG. 1 and less schematically illustrated at least in FIGS. 8 and 10, each adapter mount subassembly 180 (shown in FIGS. 1 and 10) includes an adapter mount body 182 operatively coupled to the respective lifting rail 172 and an adapter mount fastener 184 configured to selectively engage adapter mount body 182. In particular, in such examples, adapter mount fastener 184 is configured to selectively engage each of adapter mount body 182 and a respective rail interface 152 of adapter cradle 150 to operatively couple the respective adapter mount subassembly 180 to the respective rail interface 152. Adapter mount fastener 184 may include and/or be any of a variety of fasteners and/or couplers, examples of which include a pin, a ball lock pin, a mechanical fastener, a clevis fastener, a clevis, a clevis pin, a tang, and/or a bolt.

In some examples, each adapter mount subassembly 180 is configured to engage the respective rail interface 152 in a manner that enables adapter cradle 150 to shift longitudinally relative to the plurality of lifting rail assemblies 170 while adapter cradle 150 is supported by the plurality of lifting rail assemblies 170. More specifically, in some such examples, each rail interface 152 is configured to engage the respective adapter mount subassembly 180 such that rail interface 152 is configured to translate relative to adapter mount body 182 along a direction at least substantially parallel to longitudinal axis 62 of engine 60 while adapter cradle 150 is operatively coupled to the plurality of lifting rail assemblies 170. In some such examples, adapter mount body 182 of each adapter mount subassembly 180 defines a range of motion of rail interface 152 that is greater than a width of rail interface 152, as measured along a direction at least substantially parallel to longitudinal axis 62. In this manner, in such examples, engine installation system 100 may be configured such that engine 60 may be shifted along a direction parallel to longitudinal axis 62 while adapter cradle 150 is operatively supported by the plurality of lifting rail assemblies 170, such as to facilitate positioning engine 60 relative to engine bay 52 prior to operatively installing engine 60 within engine bay 52. Such a configuration additionally or alternatively may facilitate lifting adapter cradle 150 with the plurality of lifting rail assemblies 170 even when the input force is not applied to lifting rail drive input 194 of each of the plurality of lifting rail assemblies 170 perfectly concurrently. For example, in an example in which each lifting rail drive input 194 receives a torque from a crank operated by a human user, it may be impractical to rotate each lifting rail drive input 194 perfectly in unison, resulting in a circumstance in which the plurality of adapter mount subassemblies 180 are not perfectly level with one another. Additionally or alternatively, in some examples, each lifting rail assembly 170 does not extend perfectly parallel to vertical direction 12, perfectly parallel to a direction of a force of gravity, and/or perfectly perpendicular to ground surface 10, such as due to unevenness in ground surface 10, variations in the configurations of landing gear of vehicle 50, etc. In such examples, configuring each adapter mount subassembly 180 to define a range of motion of the corresponding rail interface 152 while adapter cradle 150 is supported by the plurality of lifting rail assemblies 170 enables adapter cradle 150 to pitch and/or roll slightly relative to engine bay 52 and/or relative to ground surface 10, thus enabling adapter cradle 150 to be lifted without jamming of lifting actuators 190 even when the respective lifting rail drive inputs 194 are not operated in strict unison and/or when lifting rail assemblies 170 are not perfectly parallel to vertical direction 12.

Adapter cradle 150 and/or one or more lifting rail assemblies 170 also may have any of a variety of features and/or components to facilitate pivoting adapter cradle 150 relative to transport dolly 120 during operative use of engine installation system 100. In some examples, and as schematically illustrated in FIGS. 1-2 and less schematically illustrated in FIGS. 8 and 13-14, adapter cradle 150 includes a lifting apparatus interface 158 configured to be selectively and operatively coupled to a lifting apparatus 80 (shown in FIGS. 2 and 13-14) and to receive a pivoting force 84 (shown in FIGS. 2 and 13-14) from lifting apparatus 80 to pivot adapter cradle 150 relative to transport dolly 120. In particular, in such examples, lifting apparatus 80 is configured to apply pivoting force 84 to lifting apparatus interface 158 to pivot adapter cradle 150 about hinge fitting pivot axis 104 while adapter cradle 150 is operatively coupled to vehicle 50. Lifting apparatus 80 may include and/or be any of a variety of structures and/or mechanisms for applying pivoting force 84, examples of which include a pulley and/or a hoist. In some examples, lifting apparatus 80 includes a lifting tether 82 that is configured to be selectively and operatively coupled to lifting apparatus interface 158 to provide pivoting force 84 to adapter cradle 150.

Lifting apparatus 80 may be described as being a component of engine installation system 100, or lifting apparatus 80 may be and/or refer to an ancillary piece of equipment that is utilized in conjunction with engine installation system 100. In particular, in some examples, lifting apparatus 80 includes and/or is a piece of equipment configured to be utilized in conjunction with vehicle 50 in additional applications, such as a single hoist ordnance loading system (SHOLS). In some examples, and as schematically illustrated in FIGS. 1-2 and less schematically illustrated in FIGS. 10 and 13-14, engine installation system 100 additionally includes a lifting apparatus support 176 such that lifting apparatus 80 and/or lifting tether 82 is configured to be operatively coupled to lifting apparatus support 176 during operative use of lifting apparatus 80 to pivot adapter cradle 150. In some such examples, and as best shown in FIG. 10, lifting apparatus support 176 includes and/or is a pulley wheel. In some examples, and as schematically illustrated in FIGS. 1-2 and less schematically illustrated in FIGS. 10 and 13-14, at least one lifting rail assembly 170 includes lifting apparatus support 176, such as may be operatively coupled to and/or a component of engine bay mount 174 of the lifting rail assembly 170.

In various examples, and as discussed, engine installation system 100 includes a plurality of hinge fittings 110 configured to be selectively mounted to vehicle 50 and configured to be selectively and pivotally coupled to adapter cradle 150. Each hinge fitting 110 may be configured to be selectively and pivotally coupled to adapter cradle 150 in any of a variety of manners. In some examples, and as schematically illustrated in FIGS. 1-2 and less schematically illustrated at least in FIG. 8, engine installation system 100 includes a plurality of hinge fitting interfaces 160, each configured to be operatively coupled to adapter cradle 150 and configured to selectively and pivotally engage a respective hinge fitting 110 while lifting apparatus 80 provides pivoting force 84 to adapter cradle 150. In particular, in such examples, and as schematically illustrated in FIGS. 1-2, each hinge fitting interface 160 is configured to engage the respective hinge fitting 110 at a location along hinge fitting pivot axis 104. In some examples, such as in the example of FIG. 8, each hinge fitting interface 160 is configured to be selectively and repeatedly coupled to and removed from adapter cradle 150. Additionally or alternatively, in some examples, at least one hinge fitting interface 160 is pivotally coupled to adapter cradle 150 such that hinge fitting interface 160 may pivot relative to adapter cradle 150 about an axis at least substantially parallel to hinge fitting pivot axis 104, such as to facilitate aligning hinge fitting interface 160 with the respective hinge fitting 110. However, this is not required of all examples of engine installation system 100, and it is additionally within the scope of the present disclosure that adapter cradle 150 may include and/or define each hinge fitting interface 160.

Figure 17:
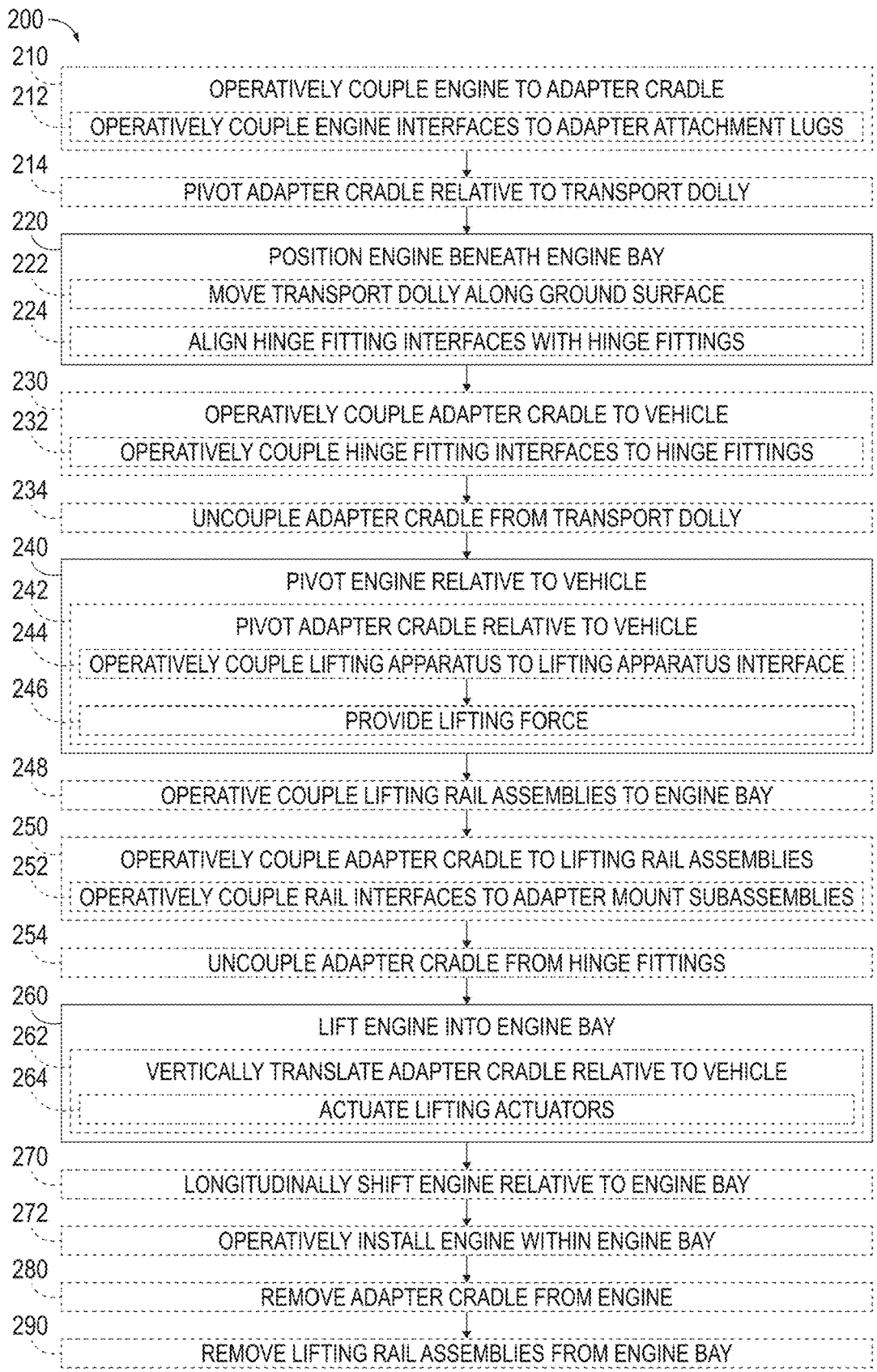
FIG. 17 is a flowchart representing examples of methods, according to the present disclosure, of installing an engine within an engine bay of a vehicle.

FIG. 17 represents a flowchart depicting methods 200, according to the present disclosure, of installing an engine within an engine bay of a vehicle, such as by utilizing an engine installation system. Examples of vehicles, engine bays, engines, and/or engine installation systems that may be utilized in conjunction with methods 200 are described herein with reference to vehicle 50, engine bay 52, engine 60, and/or engine installation system 100, respectively. As shown in FIG. 17, methods 200 include positioning, at 220, the engine beneath the engine bay; pivoting, at 240, the engine relative to the vehicle; and lifting, at 260, the engine into the engine bay. In particular, the pivoting the engine relative to the vehicle at 240 is performed subsequent to the positioning the engine beneath the engine bay at 220, and the lifting the engine into the engine bay at 260 is performed subsequent to the pivoting the engine relative to the vehicle at 240.

In some examples, and as shown in FIG. 17, methods 200 additionally include operatively coupling, at 210, the engine to an adapter cradle of the engine installation system. In some such examples, the operatively coupling the engine to the adapter cradle at 210 is performed while the adapter cradle is operatively coupled to a transport dolly of the engine installation system. Examples of adapter cradles and/or transport dollies that may be utilized in conjunction with methods 200 are described herein with reference to adapter cradle 150 and/or transport dolly 120, respectively. For example, FIGS. 3-4 may be described as illustrating an example of the operatively coupling the engine to the adapter cradle at 210 with the adapter cradle operatively coupled to the transport dolly. In particular, FIG. 3 may be described as corresponding to a configuration prior to the operatively coupling the engine to the adapter cradle at 210 and FIG. 4 may be described as corresponding to a configuration subsequent to the operatively coupling the engine to the adapter cradle at 210.

In some examples, the operatively coupling the engine to the adapter cradle at 210 includes coupling such that the engine is at least substantially fixed relative to the adapter cradle. The operatively coupling the engine to the adapter cradle at 210 may be performed in any of a variety of manners and/or utilizing any of a variety of components. In some examples, adapter cradle includes a plurality of engine interfaces, such as engine interfaces 154 described herein, and the engine includes a plurality of adapter attachment lugs, such as adapter attachment lugs 70 described herein. Accordingly, in some such examples, and as shown in FIG. 17, the operatively coupling the engine to the adapter cradle at 210 includes operatively coupling, at 212, each engine interface of the adapter cradle to a respective adapter attachment lug of the engine.

Figure 3:
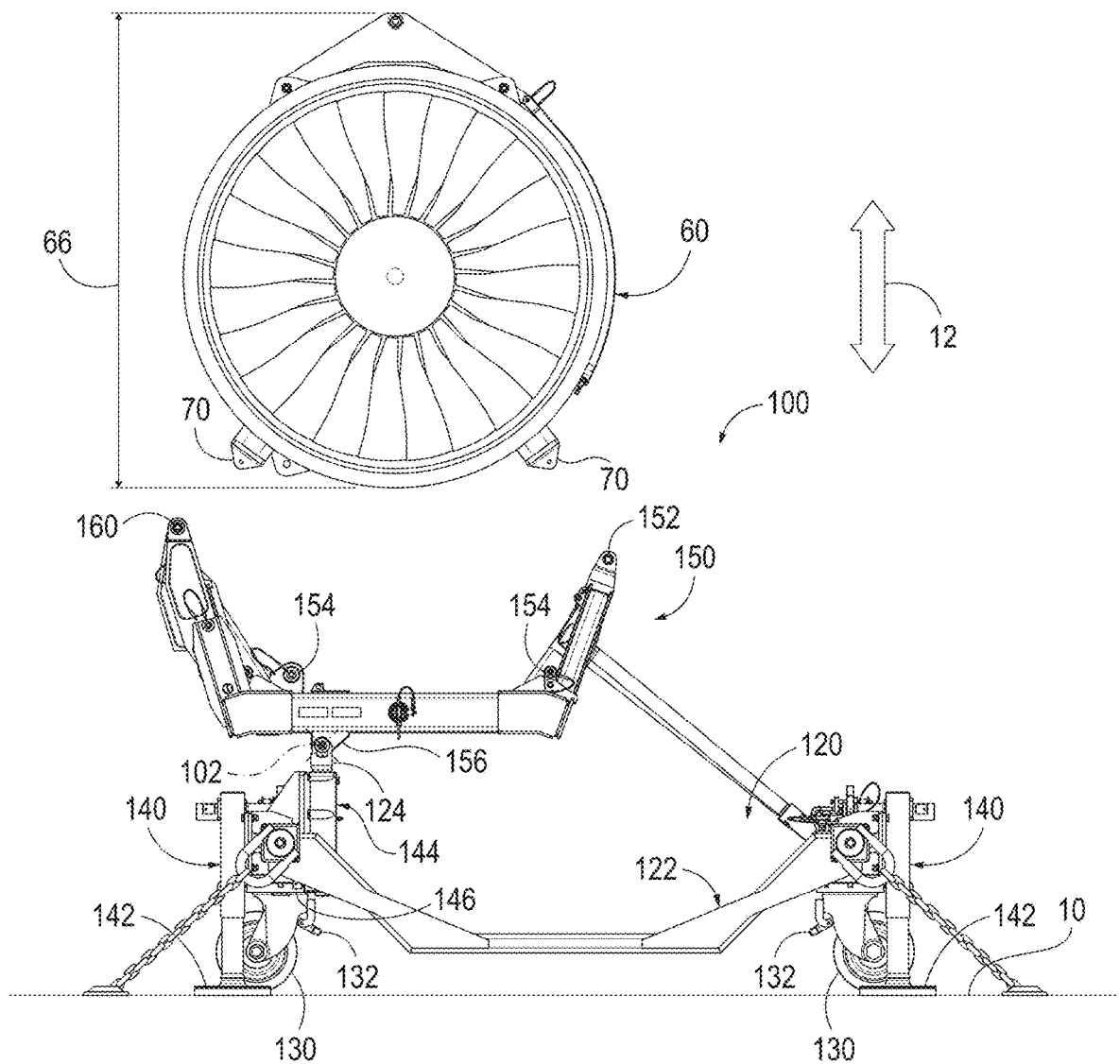
FIG. 3 is a front elevation view of an example of an engine installation system with an adapter cradle in an upright configuration operatively coupled to a transport dolly and prepared to receive an engine according to the present disclosure.
Figure 4:
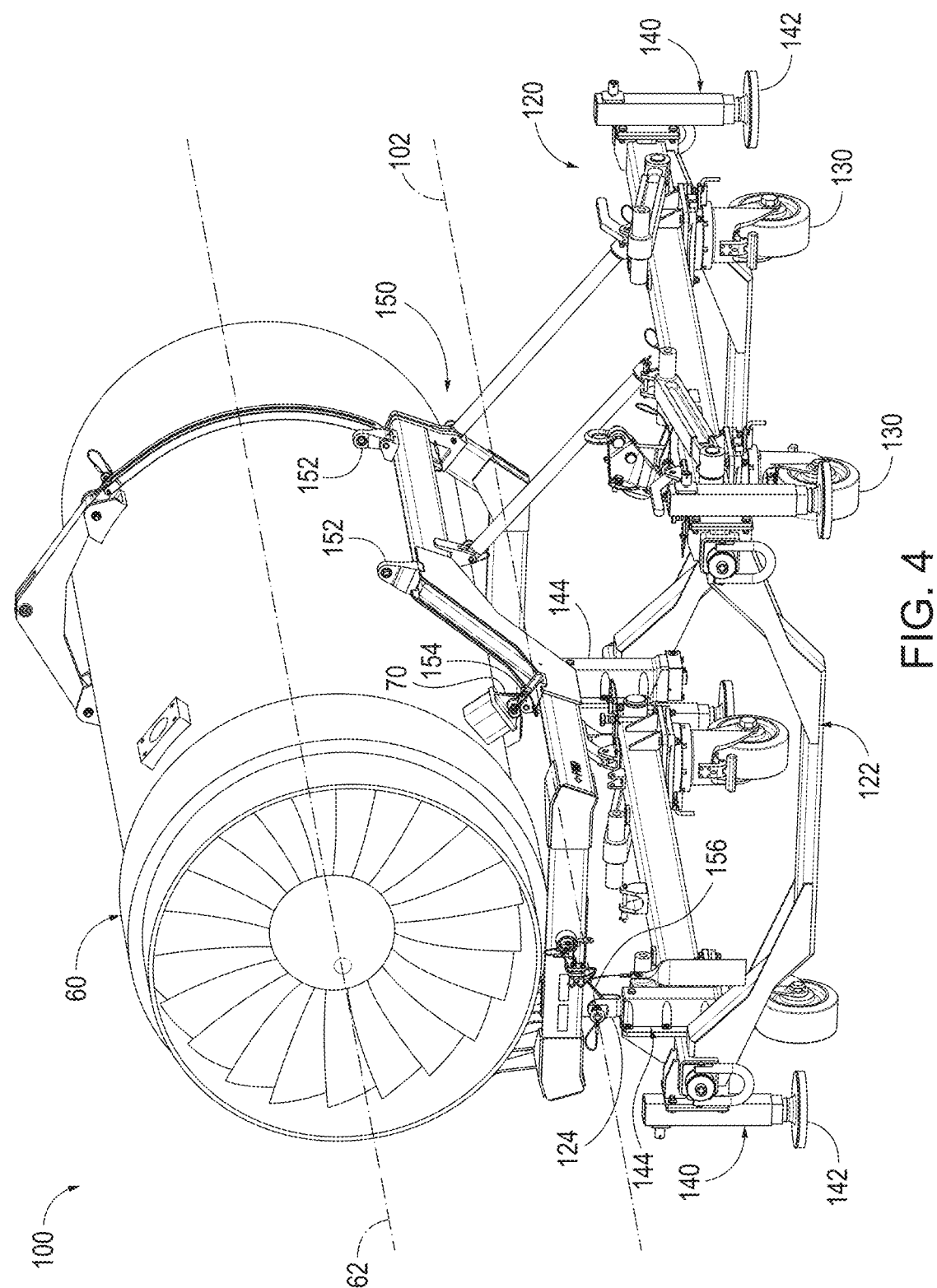
FIG. 4 is a front top side isometric view of the portion of the engine installation system of FIG. 3 with the engine operatively coupled to the adapter cradle and with the adapter cradle in the upright configuration according to the present disclosure.

In some examples, and as illustrated in FIGS. 3-4, the operatively coupling the engine to the adapter cradle at 210 is performed while the adapter cradle is in the upright configuration as described herein and while the engine is in the installation orientation as described herein. In some such examples, and as shown in FIG. 17, methods 200 include, subsequent to the operatively coupling the engine to the adapter cradle at 210 and prior to the positioning the engine beneath the engine bay at 220, pivoting, at 214, the adapter cradle relative to the transport dolly about a cradle pivot axis, such as cradle pivot axis 102 as described herein. In particular, in such examples, the pivoting the adapter cradle relative to the transport dolly at 214 includes pivoting to transition the adapter cradle to the transport configuration as described herein and to transition the engine to the transport orientation as described herein. In more specific examples, the pivoting the adapter cradle relative to the transport dolly at 214 includes pivoting the adapter cradle about the cradle pivot axis by an angle that is at least 40 degrees, at least 60 degrees, at least 80 degrees, at most 100 degrees, at most 90 degrees, at most 70 degrees, and/or at most 50 degrees. FIG. 5 may be described as illustrating a configuration of an example of the engine installation system subsequent to the pivoting the adapter cradle relative to the transport dolly at 214.

The positioning the engine beneath the engine bay at 220 may include any of a variety of steps for positioning and/or orienting the engine relative to the engine bay. In some examples, and as shown in FIG. 17, the positioning the engine beneath the engine bay at 220 includes moving, at 222, the transport dolly along a ground surface (such as ground surface 10 referenced herein) to position the adapter cradle beneath the engine bay. For example, the moving the transport dolly along the ground surface at 222 may include transporting the engine from a location away from the vehicle to a region underneath the engine bay.

Additionally or alternatively, in some examples, the positioning the engine beneath the engine bay at 220 includes positioning one or more components of the engine installation system to be operatively coupled to the engine bay. In particular, in some examples, and as shown in FIG. 17, methods 200 include, prior to the pivoting the engine relative to the vehicle at 240, operatively coupling, at 230, the adapter cradle to the vehicle. More specifically, in some examples, the engine installation system includes a plurality of hinge fittings operatively supported by the vehicle and distributed along a hinge fitting pivot axis, as well as a plurality of hinge fitting interfaces operatively coupled to the adapter cradle. In some such examples, and as shown in FIG. 17, the operatively coupling the adapter cradle to the vehicle at 230 includes operatively coupling, at 232, each hinge fitting interface to a respective hinge fitting such that each hinge fitting interface is configured to pivot relative to the respective hinge fitting about the hinge fitting pivot axis. Examples of hinge fittings, hinge fitting interfaces, and/or hinge fitting pivot axes that may be utilized in conjunction with methods 200 are described herein with reference to hinge fitting 110, hinge fitting interface 160, and/or hinge fitting pivot axis 104, respectively. In particular, FIG. 13 may be described as illustrating an example of an engine installation system subsequent to the operatively coupling the hinge fitting interfaces to the respective hinge fittings at 232.

To facilitate the operatively coupling the hinge fitting interfaces to the respective hinge fittings at 232, in some examples, and as shown in FIG. 17, the positioning the engine beneath the engine bay at 220 includes aligning, at 224, each hinge fitting interface with the respective hinge fitting. As a more specific example, the aligning the hinge fitting interfaces with the hinge fittings at 224 may include utilizing one or more adapter cradle lifting members (such as adapter cradle lifting members 144) of the transport dolly to adjust a height of the adapter cradle relative to the engine bay such that each hinge fitting interface is aligned with the respective hinge fitting.

In some examples, and as shown in FIG. 17, methods 200 include, prior to the pivoting the engine relative to the vehicle at 240, uncoupling, at 234, the adapter cradle from the transport dolly. In this manner, the adapter cradle may be described as operating primarily and/or solely to transport the engine and the adapter cradle to a location such that the adapter cradle may be operatively coupled to the engine bay, such as via the hinge fittings and the hinge fitting interfaces.

The pivoting the engine relative to the vehicle at 240 may be performed in any of a variety of manners and/or utilizing any of a variety of components. In some examples, the pivoting the engine relative to the vehicle at 240 is performed while the engine is operatively coupled to the adapter cradle. In some such examples, and as shown in FIG. 17, the pivoting the engine relative to the vehicle at 240 includes pivoting, at 242, the adapter cradle relative to the vehicle about the hinge fitting pivot axis to transition the adapter cradle from the transport configuration to the upright configuration, such as while the adapter cradle is operatively coupled to the vehicle. In some such examples, the pivoting the adapter cradle relative to the vehicle at 242 includes utilizing a lifting apparatus to provide and/or exert a pivoting force upon the adapter cradle. More specifically, in some examples, and as shown in FIG. 17, the adapter cradle includes a lifting apparatus interface, and the pivoting the adapter cradle relative to the vehicle at 242 includes operatively coupling, at 244, the lifting apparatus to the lifting apparatus interface and providing, at 246, the pivoting force to the lifting apparatus interface with the lifting apparatus. In some such examples, the operatively coupling the lifting apparatus to the lifting apparatus interface at 244 includes operatively coupling a lifting tether of the lifting apparatus to the lifting apparatus interface. Examples of lifting apparatuses, lifting apparatus interfaces, lifting tethers, and/or pivoting forces that may be utilized in conjunction with methods 200 are described herein with reference to lifting apparatus 80, lifting apparatus interface 158, lifting tether 82, and/or pivoting force 84, respectively.

In some examples, the lifting apparatus also is configured to engage another component of the engine installation system during the pivoting the adapter cradle relative to the vehicle at 242. In particular, in some examples, the engine installation system includes a lifting apparatus support, such as may be associated with and/or a component of a lifting rail assembly of the engine installation system. In some such examples, the operatively coupling the lifting apparatus to the lifting apparatus interface at 244 includes operatively coupling the lifting apparatus and/or the lifting tether to the lifting apparatus support, such as to direct the pivoting force at least partially vertically upward and/or at least partially perpendicular to the hinge fitting pivot axis. In various examples, the pivoting the adapter cradle relative to the vehicle at 242 includes pivoting the adapter cradle about the hinge fitting pivot axis by an angle that is at least 40 degrees, at least 60 degrees, at least 80 degrees, at most 100 degrees, at most 90 degrees, at most 70 degrees, and/or at most 50 degrees. Examples of lifting rail assemblies and/or lifting apparatus supports that may be utilized in conjunction with methods 200 are described herein with reference to lifting rail assembly 170 and/or lifting apparatus support 176, respectively. In particular, FIGS. 13-14 respectively may be described as illustrating an example of the engine installation system prior to and subsequent to utilizing the lifting apparatus to perform the pivoting the adapter cradle relative to the vehicle at 242.

The lifting the engine into the engine bay at 260 may be performed in any of a variety of manners and/or utilizing any of a variety of components. In some examples, and as shown in FIG. 17, methods 200 include, subsequent to the pivoting the engine relative to the vehicle at 240 and prior to the lifting the engine into the engine bay at 260, operatively coupling, at 250, the adapter cradle to a plurality of lifting rail assemblies of the engine installation system. More specifically, in some such examples, the adapter cradle includes a plurality of rail interfaces (such as rail interfaces 152 described herein), and each lifting rail assembly includes a respective lifting rail and a respective adapter mount subassembly operatively coupled to the respective lifting rail. In such examples, and as shown in FIG. 17, the operatively coupling the adapter cradle to the lifting rail assemblies at 250 includes operatively coupling, at 252, each rail interface to the respective adapter mount subassembly. Examples of rail interfaces, lifting rails, and/or adapter mount subassemblies that may be utilized in conjunction with methods 200 are described herein with reference to rail interface 152, lifting rail 172, and/or adapter mount subassembly 180, respectively.

In some examples, the operatively coupling the adapter cradle to the lifting rail assemblies at 250 is performed while the adapter cradle is operatively coupled to the plurality of hinge fittings and/or while the lifting apparatus is operatively coupled to the lifting apparatus interface. In this manner, in such examples, the plurality of hinge fittings and/or the lifting apparatus may be described as supporting and/or maintaining the adapter cradle in position relative to the engine bay and/or relative to the plurality of lifting rail assemblies during the operatively coupling the adapter cradle to the lifting rail assemblies at 250. In some such examples, and as shown in FIG. 17, methods 200 further include, prior to the lifting the engine into the engine bay at 260, uncoupling, at 254, the adapter cradle from the plurality of hinge fittings, such as by uncoupling each hinge fitting interface from the respective hinge fitting. Additionally or alternatively, in some examples in which the hinge fitting interface is selectively coupled to the adapter cradle, methods 200 include removing each hinge fitting interface from the adapter cradle prior to the lifting the engine into the engine bay at 260.

In some examples, the lifting the engine into the engine bay at 260 is performed utilizing the plurality of lifting rail assemblies. More specifically, in such examples, and as shown in FIG. 17, the lifting the engine into the engine bay at 260 includes vertically translating, at 262, the adapter cradle relative to the vehicle with the plurality of lifting rail assemblies. In particular, in some such examples, the vertically translating the adapter cradle at 262 includes translating the adapter cradle relative to the vehicle along a direction at least substantially parallel to a vertical direction, such as vertical direction 12 referred to herein. Stated differently, in some such examples, the vertically translating the adapter cradle at 262 includes translating the adapter cradle along a direction and/or a path that is not perfectly parallel to the vertical direction, such as in an example in which the plurality of lifting rail assemblies do not extend perfectly parallel to the vertical direction. Additionally or alternatively, in some examples, the vertically translating the adapter cradle at 262 includes translating the adapter cradle along a path with starting and ending locations that are offset along the vertical direction but that also includes motion (e.g., translation, pitching, rolling, etc.) of the adapter cradle at least partially in a direction perpendicular to the vertical direction.

In more specific examples, and as shown in FIG. 17, each lifting rail assembly includes a respective lifting actuator (such as lifting actuator 190 described herein), and the vertically translating the adapter cradle at 262 includes actuating, at 264, the respective lifting actuators of each lifting rail assembly. In some examples, the actuating the respective lifting actuators at 264 includes actuating the respective lifting actuators of each lifting rail assembly at least partially concurrently and/or synchronously. However, this is not strictly required in all examples of methods 200, and it is additionally within the scope of the present disclosure that the actuating the respective lifting actuators at 264 may include actuating the respective lifting actuators at least partially sequentially. For example, and as discussed above in conjunction with adapter mount subassembly 180, each lifting rail may be operatively coupled to the adapter cradle in a manner that permits a degree of relative motion between the adapter mount subassembly of the lifting rail and the respective rail interface, thus enabling the lifting the engine into the engine bay at 260 to take place even when the lifting actuators are not actuated in strict unison. In such examples, the vertically translating the adapter cradle at 262 may be described as including and/or encompassing relatively small degrees of translation of the adapter cradle along a direction perpendicular to the vertical direction and/or rotation (e.g., pitching and/or rolling) of the adapter cradle about a plane perpendicular to the vertical direction. FIGS. 15-16 respectively may be described as illustrating an example of the engine installation system prior to and subsequent to the lifting the engine into the engine bay at 260. While the present disclosure generally pertains to examples in which the engine installation system includes a plurality of lifting rail assemblies for lifting the adapter cradle, other components and/or configurations also are within the scope of the present disclosure.

In some examples, methods 200 additionally include one or more steps for installing the engine within the engine bay once the engine is received within the engine bay and in a raised position. In particular, in some examples, and as shown in FIG. 17, methods 200 further include, subsequent to the lifting the engine into the engine bay at 260, longitudinally shifting, at 270, the engine relative to the engine bay, such as along a longitudinal axis of the engine (such as longitudinal axis 62 described herein). Additionally or alternatively, in some examples, and as shown in FIG. 17, methods 200 include, subsequent to the lifting the engine into the engine bay at 260, operatively installing, at 272, the engine within the engine bay. In some examples, the operatively installing the engine at 272 is performed subsequent to the longitudinally shifting the engine at 270. In particular, in some such examples, the lifting the engine into the engine bay at 260 operates to position the engine at a location within the engine bay that is longitudinally offset (e.g., offset along the longitudinal axis of the engine) from an installed location of the engine, such that the engine must be longitudinally shifted relative to the engine bay to reach the installed location. In particular, in some examples, and as described herein, each adapter mount subassembly may be configured to be operatively coupled to the respective rail interface in a manner that permits the respective rail interface to move and/or shift longitudinally relative to the adapter mount subassembly while the adapter cradle remains operatively supported by the plurality of lifting rail assemblies. In this manner, in such examples, the longitudinally shifting the engine at 270 may be performed while the adapter cradle remains operatively supported by the plurality of lifting rail assemblies.

In some examples, and as discussed herein, the adapter cradle is configured to be selectively and/or removably coupled to the engine. Accordingly, in some examples, and as shown in FIG. 17, methods 200 additionally include, subsequent to the lifting the engine into the engine bay at 260, removing, at 280, the adapter cradle from the engine. More specifically, in some such examples, the removing the adapter cradle from the engine at 280 includes uncoupling each engine interface of the adapter cradle from the respective adapter attachment lug of the engine. In some such examples, the removing the adapter cradle from the engine at 280 is be performed subsequent to the longitudinally shifting the engine at 270 and/or subsequent to the operatively installing the engine at 272.

Additionally, in some examples, and as discussed herein, each lifting rail subassembly is configured to be selectively and/or removably coupled to the engine bay. Accordingly, in some examples, and as shown in FIG. 17, methods 200 additionally include, prior to the operatively coupling the adapter cradle to the lifting rail assemblies at 250, operatively coupling, at 248, the plurality of lifting rail assemblies to the engine bay. More specifically, some such examples, each lifting rail includes a respective engine bay mount (such as engine bay mount 174 described herein) that is configured to be selectively and fixedly coupled to a corresponding lifting rail mount location of the engine bay (such as lifting rail mount location 56 described herein). Accordingly, in some such examples, the operatively coupling the lifting rail assemblies to the engine bay at 248 includes operatively coupling the respective engine bay mount of each lifting rail assembly to the corresponding lifting rail mount location of the engine bay. Similarly, in some such examples, and as shown in FIG. 17, methods 200 further include, subsequent to the lifting the engine into the engine bay at 260, removing, at 290, each lifting rail assembly from the engine bay.

While the present disclosure generally relates to examples in which engine installation system 100 is operatively utilized to install engine 60 within engine bay 52 of vehicle 50, it is additionally within the scope of the present disclosure that the systems and/or methods disclosed herein additionally or alternatively may correspond to systems and/or methods for uninstalling and/or removing engine 60 from engine bay 52. For example, a method of uninstalling engine 60 from engine bay 52 of vehicle 50 may include one or more steps of method 200 performed in a reverse order.

Illustrative, non-exclusive examples of inventive subject matter according to the present disclosure are described in the following enumerated paragraphs:

A1. An engine installation system (100) for installing an engine (60) within an engine bay (52) of a vehicle (50), the engine installation system (100) comprising:

an adapter cradle (150) configured to be selectively and operatively coupled to the engine (60) to support the engine (60); and a transport dolly (120) configured to be selectively and operatively coupled to the adapter cradle (150) to support the adapter cradle (150) to facilitate transporting the adapter cradle (150) and the engine (60) across a ground surface (10);

wherein the adapter cradle (150) is configured to be selectively coupled to each of the transport dolly (120) and the vehicle (50); and wherein the engine installation system (100) is configured such that:

(i) when the adapter cradle (150) is operatively coupled to the transport dolly (120), the adapter cradle (150) is configured to pivot relative to the transport dolly (120) about a cradle pivot axis (102) to transition the adapter cradle (150) among a plurality of configurations defined between and including a transport configuration and an upright configuration; and (ii) when the adapter cradle (150) is operatively coupled to the vehicle (50), the adapter cradle (150) is configured to pivot relative to the vehicle (50) about a hinge fitting pivot axis (104) to transition the adapter cradle (150) among the plurality of configurations defined between and including the transport configuration and the upright configuration.

A2. The engine installation system (100) of paragraph A1, wherein the adapter cradle (150) is configured to be operatively coupled to each of the transport dolly (120) and the vehicle (50) at least partially concurrently.

A3. The engine installation system (100) of any of paragraphs A1-A2, wherein the adapter cradle (150) is configured to be operatively coupled to the transport dolly (120) and to the vehicle (50) at least partially sequentially.

A4. The engine installation system (100) of any of paragraphs A1-A3, wherein the adapter cradle (150) is configured to pivot relative to one or both of the transport dolly (120) and the vehicle (50) and about one or both of the cradle pivot axis (102) and the hinge fitting pivot axis (104) through an angle that is one or more of at least 40 degrees, at least 60 degrees, at least 80 degrees, at most 100 degrees, at most 90 degrees, at most 70 degrees, and at most 50 degrees, as the adapter cradle (150) transitions between the transport configuration and the upright configuration.

A5. The engine installation system (100) of any of paragraphs A1-A4, further comprising one or both of:

a plurality of lifting rail assemblies (170) configured to be selectively and operatively coupled to the adapter cradle (150) to support the adapter cradle (150) relative to the vehicle (50) and to translate the adapter cradle (150) into and out of the engine bay (52) along a direction at least substantially parallel to a vertical direction (12); and a plurality of hinge fittings (110) configured to be selectively mounted to the vehicle (50) and configured to be selectively and pivotally coupled to the adapter cradle (150);

wherein the adapter cradle (150) is configured to be selectively and operatively coupled to the vehicle (50) via one or both of the plurality of lifting rail assemblies (170) and the plurality of hinge fittings (110) during operative use of the engine installation system (100).

A6. The engine installation system (100) of paragraph A5, wherein the adapter cradle (150) is configured to be selectively and operatively coupled to the plurality of lifting rail assemblies (170) while the adapter cradle (150) is operatively coupled to the plurality of hinge fittings (110) and when the adapter cradle (150) is in the upright configuration.

A7. The engine installation system (100) of any of paragraphs A5-A6, wherein each hinge fitting (110) of the plurality of hinge fittings (110) is configured to be mounted at a respective hinge fitting mount location (54) within the engine bay (52) during operative use of the engine installation system (100) to install the engine (60).

A8. The engine installation system (100) of any of paragraphs A1-A7, wherein the engine installation system (100) is configured such that, when the engine (60) is operatively coupled to the adapter cradle (150), the adapter cradle (150) is configured to pivot the engine (60) about one or both of the cradle pivot axis (102) and the hinge fitting pivot axis (104) to transition the engine (60) among a plurality of orientations defined between and including a transport orientation and an installation orientation; wherein, when the engine (60) is operatively coupled to the adapter cradle (150), the engine (60) is in the transport orientation when the adapter cradle (150) is in the transport configuration, and the engine (60) is in the installation orientation when the adapter cradle (150) is in the upright configuration.

A9. The engine installation system (100) of any of paragraphs A1-A8, wherein the engine installation system (100) is configured such that one or both of the cradle pivot axis (102) and the hinge fitting pivot axis (104) is at least substantially parallel to a longitudinal axis (62) of the engine (60).

A10. The engine installation system (100) of any of paragraphs A1-A9, wherein the engine (60) has a transportation vertical dimension (64), as measured along a direction parallel to the vertical direction (12) when the engine (60) is in the transport orientation; wherein the engine (60) has an upright vertical dimension (66), as measured along a direction parallel to the vertical direction (12) when the engine (60) is in the installation orientation; and wherein the upright vertical dimension (66) is greater than the transportation vertical dimension (64).

A11. The engine installation system (100) of any of paragraphs A1-A10, wherein the transport dolly (120) includes a dolly frame (122) configured to support the adapter cradle (150); and optionally wherein the transport dolly (120) further includes a plurality of casters (130) operatively coupled to the dolly frame (122) and configured to facilitate transporting the transport dolly (120) across the ground surface (10).

A12. The engine installation system (100) of any of paragraphs A1-A11, wherein the transport dolly (120) includes a plurality of adapter cradle mounts (124); wherein the adapter cradle (150) includes a corresponding plurality of dolly interfaces (156); and wherein each dolly interface (156) of the plurality of dolly interfaces (156) is configured to be selectively coupled to a corresponding adapter cradle mount (124) of the plurality of adapter cradle mounts (124) to pivotally couple the adapter cradle (150) to the transport dolly (120).

A13. The engine installation system (100) of paragraph A12, wherein the plurality of adapter cradle mounts (124) and the plurality of dolly interfaces (156) each are distributed along the cradle pivot axis (102) when the adapter cradle (150) is operatively coupled to the transport dolly (120).

A14. The engine installation system (100) of any of paragraphs A12-A13, wherein each dolly interface (156) of the plurality of dolly interfaces (156) is configured to be selectively uncoupled from the corresponding adapter cradle mount (124) to selectively uncouple the adapter cradle (150) from the transport dolly (120).

A15. The engine installation system (100) of any of paragraphs A12-A14, wherein each adapter cradle mount (124) of the plurality of adapter cradle mounts (124) includes, and optionally is, one or more of a pin, a ball lock pin, a pin receiver, a clevis fastener, a clevis, a clevis pin, a tang, a latch, a hook, a hinge, and a bolt.

A16. The engine installation system (100) of any of paragraphs A12-A15, wherein each dolly interface (156) of the plurality of dolly interfaces (156) includes, and optionally is, one or more of a pin, a ball lock pin, a pin receiver, a clevis fastener, a clevis, a clevis pin, a tang, a latch, a hook, a hinge, and a bolt.

A17. The engine installation system (100) of any of paragraphs A12-A16, wherein the transport dolly (120) includes a plurality of adapter cradle lifting members (144) configured to selectively adjust one or both of an orientation and a vertical height of the adapter cradle (150) relative to the dolly frame (122) when the adapter cradle (150) is operatively coupled to the transport dolly (120).

A18. The engine installation system (100) of paragraph A17, wherein one or more of:
(i) each adapter cradle mount (124) of the plurality of adapter cradle mounts (124) is operatively coupled to a corresponding adapter cradle lifting member (144) of the plurality of adapter cradle lifting members (144);
(ii) each adapter cradle lifting member (144) of the plurality of adapter cradle lifting members (144) includes a corresponding adapter cradle mount (124) of the plurality of adapter cradle mounts (124); and
(iii) each adapter cradle lifting member (144) of the plurality of adapter cradle lifting members (144) operatively supports the corresponding adapter cradle mount (124).

A19. The engine installation system (100) of paragraph A18, wherein each adapter cradle lifting member (144) of the plurality of adapter cradle lifting members (144) is configured to be independently transitioned among a plurality of vertical positions defined between and including a lowered position, in which the corresponding adapter cradle mount (124) is proximal to the ground surface (10) during operative use of the engine installation system (100), and a raised position, in which the corresponding adapter cradle mount (124) is distal to the ground surface (10) during operative use of the engine installation system (100).

A20. The engine installation system (100) of any of paragraphs A17-A19, wherein each adapter cradle lifting member (144) of the plurality of adapter cradle lifting members (144) includes, and optionally is, one or more of a mechanical actuator, a screw, a leadscrew, a gear, a rack and pinion assembly, a ratchet mechanism, a lift cylinder, a hydraulic lifting actuator, and a pneumatic lifting actuator.

A21. The engine installation system (100) of any of paragraphs A17-A20, wherein each adapter cradle lifting member (144) of the plurality of adapter cradle lifting members (144) is configured to be manually actuated, A22. The engine installation system (100) of any of paragraphs A17-A21, wherein each adapter cradle lifting member (144) of the plurality of adapter cradle lifting member (144) includes a lifting member drive input (146) configured to receive an input force and/or torque for actuating the respective adapter cradle lifting member (144), optionally wherein the lifting member drive input (146) includes, or is configured to receive a torque from, a crank.

A23. The engine installation system (100) of any of paragraphs A11-A22, wherein the transport dolly (120) includes one or more transport handles (126) operatively coupled to the dolly frame (122) and configured to be gripped by a user to facilitate transporting the transport dolly (120) across the ground surface (10).

A24. The engine installation system (100) of any of paragraphs A11-A23, wherein the transport dolly (120) includes one or more caster brakes (132) configured to selectively restrict a corresponding one or more casters (130) of the plurality of casters (130) from facilitating transporting the transport dolly (120) across the ground surface (10).

A25. The engine installation system (100) of any of paragraphs A1-A24, wherein the transport dolly (120) includes one or more stability jacks (140) configured to selectively retain the transport dolly (120) in place relative to the ground surface (10) during operative use of the engine installation system (100) to install the engine (60) within the engine bay (52); optionally wherein each stability jack (140) of the one or more stability jacks (140) includes a stabilizer pad (142) that is configured to selectively engage the ground surface (10).

A26. The engine installation system (100) of any of paragraphs A1-A25, when dependent from paragraph A5, wherein each lifting rail assembly (170) of the plurality of lifting rail assemblies (170) includes:
a respective lifting rail (172) configured to be supported by the engine bay (52) during operative use of the engine installation system (100); and
a respective adapter mount subassembly (180) operatively coupled to the respective lifting rail (172) and configured to be selectively coupled to the adapter cradle (150);
wherein the respective adapter mount subassembly (180) is configured to translate relative to the respective lifting rail (172) to translate the adapter cradle (150) in the direction at least substantially parallel to the vertical direction (12).

A27. The engine installation system (100) of paragraph A26, wherein each lifting rail assembly (170) of the plurality of lifting rail assemblies (170) includes a respective lifting actuator (190) operatively coupled to each of the respective lifting rail (172) and the respective adapter mount subassembly (180) and configured to selectively translate the respective adapter mount subassembly (180) relative to the respective lifting rail (172).

A28. The engine installation system (100) of paragraph A27, wherein the respective lifting actuator (190) includes, and optionally is, one or more of a screw, a leadscrew, a gear, a rack and pinion assembly, and a ratchet mechanism.

A29. The engine installation system (100) of any of paragraphs A27-A28, wherein the respective lifting actuator (190) is configured to be manually actuated.

A30. The engine installation system (100) of any of paragraphs A27-A29, wherein each lifting rail assembly (170) of the plurality of lifting rail assemblies (170) includes a lifting rail drive input (194) configured to receive an input force and/or torque for actuating the respective lifting actuator (190), optionally wherein the lifting rail drive input (194) includes, or is configured to receive a torque from, a crank.

A31. The engine installation system (100) of any of paragraphs A26-A30, wherein each lifting rail assembly (170) of the plurality of lifting rail assemblies (170) includes a respective engine bay mount (174) operatively coupled to the respective lifting rail (172) and configured to be fixedly coupled to a corresponding lifting rail mount location (56) of the engine bay (52); and optionally wherein the respective engine bay mount (174) is fixedly coupled to the respective lifting rail (172).

A32. The engine installation system (100) of any of paragraphs A1-A31, wherein the adapter cradle (150) includes a plurality of engine interfaces (154), each configured to be selectively coupled to a respective adapter attachment lug (70) of a plurality of adapter attachment lugs (70) of the engine (60) to operatively couple the engine (60) to the adapter cradle (150).

A33. The engine installation system (100) of any of paragraphs A1-A32, when dependent from paragraph A5, wherein the adapter cradle (150) includes a plurality of rail interfaces (152), each configured to selectively engage the respective adapter mount subassembly (180) of a corresponding lifting rail assembly (170) of the plurality of lifting rail assemblies (170) to selectively couple the adapter cradle (150) to the plurality of lifting rail assemblies (170).

A34. The engine installation system (100) of paragraph A33, wherein the respective adapter mount subassembly (180) of each lifting rail assembly (170) of the plurality of lifting rail assemblies (170) includes:
an adapter mount body (182) operatively coupled to respective the lifting rail (172); and
an adapter mount fastener (184) configured to selectively engage each of the adapter mount body (182) and a respective rail interface (152) of the plurality of rail interfaces (152) to operatively couple the respective adapter mount subassembly (180) to the respective rail interface (152).

A35. The engine installation system (100) of paragraph A34, wherein the adapter mount fastener (184) includes, and optionally is, one or more of a pin, a ball lock pin, a clevis fastener, a clevis, a clevis pin, a tang, and a bolt.

A36. The engine installation system (100) of any of paragraphs A34-A35, wherein each rail interface (152) of the plurality of rail interfaces (152) is configured to engage the respective adapter mount subassembly (180) such that the rail interface (152) is configured to translate relative to the adapter mount body (182) along a direction at least substantially parallel to a/the longitudinal axis (62) of the engine (60) while the adapter cradle (150) is operatively coupled to the plurality of lifting rail assemblies (170).

A37. The engine installation system (100) of paragraph A36, wherein the adapter mount body (182) of each respective adapter mount subassembly (180) defines a range of motion of the rail interface (152) that is greater than a width of the rail interface (152), as measured along a direction at least substantially parallel to the longitudinal axis (62) of the engine (60).

A38. The engine installation system (100) of any of paragraphs A1-A37, wherein the adapter cradle (150) includes a lifting apparatus interface (158) configured to be selectively and operatively coupled to a lifting apparatus (80) and to receive a pivoting force (84) from the lifting apparatus (80) to pivot the adapter cradle (150) relative to the transport dolly (120) about the hinge fitting pivot axis (104) while the adapter cradle (150) is operatively coupled to the vehicle (50).

A39. The engine installation system (100) of paragraph A38, wherein the lifting apparatus (80) includes one or both of a pulley and a hoist.

A40. The engine installation system (100) of any of paragraphs A38-A39, wherein the lifting apparatus (80) includes a lifting tether (82) that is configured to be selectively and operatively coupled to the lifting apparatus interface (158) to provide the pivoting force (84) to the adapter cradle (150).

A41. The engine installation system (100) of any of paragraphs A38-A40, further comprising a lifting apparatus support (176); wherein one or both of the lifting apparatus (80) and a/the lifting tether (82) is/are configured to be operatively coupled to the lifting apparatus support (176) during operative use of the lifting apparatus (80) to pivot the adapter cradle (150) about the hinge fitting pivot axis (104).

A42. The engine installation system (100) of paragraph A41, wherein the lifting apparatus support (176) includes, and optionally is, a pulley wheel.

A43. The engine installation system (100) of any of paragraphs A48-A42, when dependent from paragraph A5, wherein at least one lifting rail assembly (170) of the plurality of lifting rail assemblies (170) includes the lifting apparatus support (176).

A44. The engine installation system (100) of any of paragraphs A1-A43, further comprising a plurality of hinge fitting interfaces (160), each configured to be operatively coupled to the adapter cradle (150) and configured to selectively and pivotally engage a respective hinge fitting (110) of a/the plurality of hinge fittings (110) while a/the lifting apparatus (80) provides a/the pivoting force (84) to the adapter cradle (150).

A45. The engine installation system (100) of paragraph A44, wherein each hinge fitting interface (160) of the plurality of hinge fitting interfaces (160) is configured to engage the respective hinge fitting (110) at a location along the hinge fitting pivot axis (104).

A46. The engine installation system (100) of any of paragraphs A44-A45, wherein at least one hinge fitting interface (160) of the plurality of hinge fitting interfaces (160) is configured to be selectively and repeatedly coupled to and removed from the adapter cradle (150).

A47. The engine installation system (100) of any of paragraphs A44-A46, wherein at least one hinge fitting interface (160) of the plurality of hinge fitting interfaces (160) is pivotally coupled to the adapter cradle (150); optionally wherein the at least one hinge fitting interface (160) of the plurality of hinge fitting interfaces (160) is configured to pivot relative to the adapter cradle (150) about an axis at least substantially parallel to the hinge fitting pivot axis (104).

A48. The engine installation system (100) of any of paragraphs A44-A47, wherein the adapter cradle (150) includes and/or defines at least one hinge fitting interface (160) of the plurality of hinge fitting interfaces (160).

A49. The engine installation system (100) of any of paragraphs A1-A48, in combination with the engine (60).

B1. A method (200) of installing an engine (60) within an engine bay (52) of a vehicle (50), the method comprising:

positioning (220) the engine (60) beneath the engine bay (52);

subsequent to the positioning (220) the engine (60) beneath the engine bay (52), pivoting (240) the engine (60) relative to the vehicle (50); and subsequent to the pivoting (240) the engine (60) relative to the vehicle (50), lifting (260) the engine (60) into the engine bay (52).

B2. The method (200) of paragraph B1, wherein the method is performed utilizing the engine installation system (100) of any of paragraphs A1-A49.

B3. The method (200) of any of paragraphs B1-B2, further comprising, prior to the positioning (220) the engine (60) beneath the engine bay (52), operatively coupling (210) the engine (60) to an/the adapter cradle (150) of the engine installation system (100).

B4. The method (200) of paragraph B3, wherein the operatively coupling (210) the engine (60) to the adapter cradle (150) is performed while the adapter cradle (150) is operatively coupled to a/the transport dolly (120) of the engine installation system (100).

B5. The method (200) of any of paragraphs B3-B4, wherein the operatively coupling (210) the engine (60) to the adapter cradle (150) includes coupling such that the engine (60) is at least substantially fixed relative to the adapter cradle (150).

B6. The method (200) of any of paragraphs B3-B5, wherein the adapter cradle (150) includes a/the plurality of engine interfaces (154); wherein the engine (60) includes a/the plurality of adapter attachment lugs (70); and wherein the operatively coupling (210) the engine (60) to the adapter cradle (150) includes operatively coupling (212) each engine interface (154) of the plurality of engine interfaces (154) to a/the respective adapter attachment lug (70) of the plurality of adapter attachment lugs (70).

B7. The method (200) of any of paragraphs B3-B6, wherein the operatively coupling (210) the engine (60) to the adapter cradle (150) is performed while the adapter cradle (150) is in an/the upright configuration and while the engine (60) is in a/the installation orientation; and wherein the method further comprises, subsequent to the operatively coupling (210) the engine (60) to the adapter cradle (150) and prior to the positioning (220) the engine (60) beneath the engine bay (52), pivoting (214) the adapter cradle (150) relative to the transport dolly (120) about a/the cradle pivot axis (102) to transition the adapter cradle (150) to the transport configuration and to transition the engine (60) to the transport orientation.

B8. The method (200) of paragraph B7, wherein the pivoting (214) the adapter cradle (150) relative to the transport dolly (120) includes pivoting the adapter cradle (150) about the cradle pivot axis (102) by an angle that is one or more of at least 40 degrees, at least 60 degrees, at least 80 degrees, at most 100 degrees, at most 90 degrees, at most 70 degrees, and at most 50 degrees.

B9. The method (200) of any of paragraphs B1-B8, wherein the positioning (220) the engine (60) beneath the engine bay (52) includes moving (222) a/the transport dolly (120) along a/the ground surface (10) to position the adapter cradle (150) beneath the engine bay (52).

B10. The method (200) of any of paragraphs B1-B9, further comprising, prior to the pivoting (240) the engine (60) relative to the vehicle (50), operatively coupling (230) an/the adapter cradle (150) to the vehicle (50).

B11. The method (200) of paragraph B10, wherein the engine installation system (100) includes:

a/the plurality of hinge fittings (110) operatively supported by the vehicle (50) and distributed along the hinge fitting pivot axis (104); and a/the plurality of hinge fitting interfaces (160) operatively coupled to the adapter cradle (150);

and wherein the operatively coupling (230) the adapter cradle (150) to the vehicle (50) includes operatively coupling (232) each hinge fitting interface (160) of the plurality of hinge fitting interfaces (160) to a/the respective hinge fitting (110) of the plurality of hinge fittings (110) such that each hinge fitting interface (160) of the plurality of hinge fitting interfaces (160) is configured to pivot relative to the respective hinge fitting (110) about the hinge fitting pivot axis (104).

B12. The method (200) of paragraph B11, wherein the positioning (220) the engine (60) beneath the engine bay (52) includes aligning (224) each hinge fitting interface (160) of the plurality of hinge fitting interfaces (160) with the respective hinge fitting (110) of the plurality of hinge fittings (110); and optionally wherein the aligning (224) each hinge fitting interface (160) with the respective hinge fitting (110) includes actuating at least one adapter cradle lifting member (144) of a/the plurality of adapter cradle lifting members (144) to vary a/the vertical position of a/the corresponding adapter cradle mount (124).

B13. The method (200) of any of paragraphs B1-B12, further comprising, prior to the pivoting (240) the engine (60) relative to the vehicle (50), uncoupling (234) an/the adapter cradle (150) from the transport dolly (120).

B14. The method (200) of any of paragraphs B1-B13, wherein the pivoting (240) the engine (60) relative to the vehicle (50) is performed while the engine (60) is operatively coupled to an/the adapter cradle (150); and wherein the pivoting (240) the engine (60) relative to the vehicle (50) includes pivoting (242) the adapter cradle (150) relative to the vehicle (50) about a/the hinge fitting pivot axis (104) to transition the adapter cradle (150) from the transport configuration to the upright configuration.

B15. The method (200) of paragraph B14, wherein the pivoting (242) the adapter cradle (150) relative to the vehicle (50) is performed while the adapter cradle (150) is operatively coupled to the vehicle (50).

B16. The method (200) of any of paragraphs B14-B15, wherein the pivoting (242) the adapter cradle (150) relative to the vehicle (50) includes pivoting the adapter cradle (150) about the hinge fitting pivot axis (104) by an angle that is one or more of at least 40 degrees, at least 60 degrees, at least 80 degrees, at most 100 degrees, at most 90 degrees, at most 70 degrees, and at most 50 degrees.

B17. The method (200) of any of paragraphs B14-B16, wherein the adapter cradle (150) includes a/the lifting apparatus interface (158); and wherein the pivoting (242) the adapter cradle (150) relative to the vehicle (50) includes:

operatively coupling (244) a/the lifting apparatus (80) to the lifting apparatus interface (158); and providing (246), with the lifting apparatus (80), the pivoting force (84) to the lifting apparatus interface (158).

B18. The method (200) of paragraph B17, wherein the operatively coupling (244) the lifting apparatus (80) to the lifting apparatus interface (158) includes operatively coupling a/the lifting tether (82) of the lifting apparatus (80) to the lifting apparatus interface (158).

B19. The method (200) of paragraph B18, wherein the operatively coupling (244) the lifting apparatus (80) to the lifting apparatus interface (158) includes operatively coupling one or both of the lifting apparatus (80) and the lifting tether (82) to a/the lifting apparatus support (176).

B20. The method (200) of any of paragraphs B1-B19, further comprising, subsequent to the pivoting (240) the engine (60) relative to the vehicle (50) and prior to the lifting (260) the engine (60) into the engine bay (52), operatively coupling (250) an/the adapter cradle (150) to a/the plurality of lifting rail assemblies (170) of the engine installation system (100).

B21. The method (200) of paragraph B20, wherein the adapter cradle (150) includes a/the plurality of rail interfaces (152); wherein each lifting rail assembly (170) of the plurality of lifting rail assemblies (170) includes a/the respective lifting rail (172) and a/the respective adapter mount subassembly (180) operatively coupled to the respective lifting rail (172); and wherein the operatively coupling (250) the adapter cradle (150) to the plurality of lifting rail assemblies (170) includes operatively coupling (252) each rail interface (152) of the plurality of rail interfaces (152) to the respective adapter mount subassembly (180) of a respective lifting rail assembly (170) of the plurality of lifting rail assemblies (170).

B22. The method (200) of any of paragraphs B20-B21, wherein the operatively coupling (250) the adapter cradle (150) to the plurality of lifting rail assemblies (170) is performed while one or both of:

the adapter cradle (150) is operatively coupled to a/the plurality of hinge fittings (110); and a/the lifting apparatus (80) is operatively coupled to the a/lifting apparatus interface (158).

B23. The method (200) of any of paragraphs B20-B22, further comprising, prior to the operatively coupling (250) the adapter cradle (150) to the plurality of lifting rail assemblies (170), operatively coupling (248) the plurality of lifting rail assemblies (170) to the engine bay (52).

B24. The method (200) of paragraph B23, wherein each lifting rail assembly (170) of the plurality of lifting rail assemblies (170) includes a/the respective engine bay mount (174); and wherein the operatively coupling (248) the plurality of lifting rail assemblies (170) to the engine bay (52) includes operatively coupling the respective engine bay mount (174) of each lifting rail assembly (170) of the plurality of lifting rail assemblies (170) to a/the corresponding lifting rail mount location (56) of the engine bay (52).

B25. The method (200) of any of paragraphs B1-B24, wherein the lifting (260) the engine (60) into the engine bay (52) includes vertically translating (262), with a/the plurality of lifting rail assemblies (170), an/the adapter cradle (150) relative to the vehicle (50).

B26. The method (200) of paragraph B25, wherein the vertically translating (262) the adapter cradle (150) relative to the vehicle (50) includes translating the adapter cradle (150) relative to the vehicle (50) along a direction at least substantially parallel to a/the vertical direction (12).

B27. The method (200) of any of paragraphs B25-B26, wherein each lifting rail assembly (170) of the plurality of lifting rail assemblies (170) includes a/the respective lifting actuator (190); and wherein the vertically translating (262) the adapter cradle (150) relative to the vehicle (50) includes actuating (264) the respective lifting actuators (190) of each lifting rail assembly (170) of the plurality of lifting rail assemblies (170).

B28. The method (200) of paragraph B27, wherein the actuating (264) the respective lifting actuators (190) includes actuating the respective lifting actuators (190) of each lifting rail assembly (170) of the plurality of lifting rail assemblies (170) at least partially concurrently.

B29. The method (200) of any of paragraphs B27-B28, wherein the actuating (264) the respective lifting actuators (190) includes actuating the respective lifting actuators (190) of each lifting rail assembly (170) of the plurality of lifting rail assemblies (170) at least partially sequentially.

B30. The method (200) of any of paragraphs B1-B29, further comprising, prior to the lifting (260) the engine (60) into the engine bay (52), uncoupling (254) an/the adapter cradle (150) from a/the plurality of hinge fittings (110).

B31. The method (200) of paragraph B30, wherein the uncoupling (254) the adapter cradle (150) from the plurality of hinge fittings (110) includes uncoupling each hinge fitting interface (160) of a/the plurality of hinge fitting interfaces (160) from a/the respective hinge fitting (110) of a/the plurality of hinge fittings (110).

B32. The method (200) of any of paragraphs B1-B31, further comprising, subsequent to the lifting (260) the engine (60) into the engine bay (52), longitudinally shifting (270) the engine (60) relative to the engine bay (52) along a/the longitudinal axis (62) of the engine (60).

B33. The method (200) of any of paragraphs B1-B32, further comprising, subsequent to the lifting (260) the engine (60) into the engine bay (52), operatively installing (272) the engine (60) within the engine bay (52).

B34. The method (200) of paragraph B33, when dependent from paragraph B32, wherein the operatively installing (272) the engine (60) within the engine bay (52) is performed subsequent to the longitudinally shifting (270) the engine (60) relative to the engine bay (52).

B35. The method (200) of any of paragraphs B1-B34, further comprising, subsequent to the lifting (260) the engine (60) into the engine bay (52), removing (280) an/the adapter cradle (150) from the engine (60).

B36. The method (200) of paragraph B35, when dependent from paragraph B32, wherein the removing (280) the adapter cradle (150) from the engine (60) is performed subsequent to the longitudinally shifting (270) the engine (60) within the engine bay (52).

B37. The method (200) of any of paragraphs B35-B36, when dependent from paragraph B33, wherein the removing (280) the adapter cradle (150) from the engine (60) is performed subsequent to the operatively installing (272) the engine (60) within the engine bay (52).

B38. The method (200) of any of paragraphs B1-B37, further comprising, subsequent to the lifting (260) the engine (60) into the engine bay (52), removing (290) each lifting rail assembly (170) of a/the plurality of lifting rail assemblies (170) from the engine bay (52).

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. An engine installation system for installing an engine within an engine bay of a vehicle, the engine installation system comprising:

a plurality of hinge fittings configured to be selectively and directly mounted to the vehicle;

an adapter cradle configured to be selectively and operatively coupled to the engine to support the engine;

a plurality of hinge fitting interfaces, each configured to be operatively coupled to the adapter cradle and configured to selectively and pivotally engage a respective hinge fitting of the plurality of hinge fittings to define a hinge fitting pivot axis; and a transport dolly configured to be selectively and operatively coupled to the adapter cradle to support the adapter cradle to facilitate transporting the adapter cradle and the engine across a ground surface;

wherein the adapter cradle is configured to be selectively coupled to each of the transport dolly and the vehicle; wherein the adapter cradle is configured to be selectively and operatively coupled to the vehicle via the plurality of hinge fittings during operative use of the engine installation system; and wherein the engine installation system is configured such that:

(i) when the adapter cradle is operatively coupled to the transport dolly, the adapter cradle is configured to pivot relative to the transport dolly about a cradle pivot axis to transition the adapter cradle among a plurality of configurations defined between and including a transport configuration and an upright configuration; and (ii) when the adapter cradle is operatively coupled to the vehicle, the adapter cradle is configured to pivot relative to the vehicle about the hinge fitting pivot axis to transition the adapter cradle among the plurality of configurations defined between and including the transport configuration and the upright configuration.

2. The engine installation system of claim 1, further comprising a plurality of lifting rail assemblies configured to be selectively and operatively coupled to the adapter cradle to support the adapter cradle relative to the vehicle and to translate the adapter cradle into and out of the engine bay along a direction at least substantially parallel to a vertical direction; wherein the adapter cradle is configured to be selectively coupled to the vehicle via the plurality of lifting rail assemblies during operative use of the engine installation system.

3. The engine installation system of claim 2, wherein each lifting rail assembly of the plurality of lifting rail assemblies includes:

a respective lifting rail configured to be supported by the engine bay during operative use of the engine installation system;

a respective adapter mount subassembly operatively coupled to the respective lifting rail and configured to be selectively coupled to the adapter cradle; and a respective lifting actuator operatively coupled to each of the respective lifting rail and the respective adapter mount subassembly and configured to selectively translate the respective adapter mount subassembly relative to the respective lifting rail to translate the adapter cradle in the direction at least substantially parallel to the vertical direction.

4. The engine installation system of claim 3, wherein the adapter cradle includes a plurality of rail interfaces, each configured to selectively engage the respective adapter mount subassembly of a corresponding lifting rail assembly of the plurality of lifting rail assemblies to selectively couple the adapter cradle to the plurality of lifting rail assemblies; wherein the respective adapter mount subassembly of each lifting rail assembly of the plurality of lifting rail assemblies includes:

an adapter mount body operatively coupled to the respective lifting rail; and
an adapter mount fastener configured to selectively engage each of the adapter mount body and a respective rail interface of the plurality of rail interfaces to operatively couple the respective adapter mount subassembly to the respective rail interface.

5. The engine installation system of claim 4, wherein each rail interface of the plurality of rail interfaces is configured to engage the respective adapter mount subassembly such that the rail interface is configured to translate relative to the adapter mount body along a direction at least substantially parallel to a longitudinal axis of the engine while the adapter cradle is operatively coupled to the plurality of lifting rail assemblies.

6. The engine installation system of claim 1, wherein the transport dolly includes:
a dolly frame configured to support the adapter cradle;
a plurality of casters operatively coupled to the dolly frame and configured to facilitate transporting the transport dolly across the ground surface; and
one or more stability jacks configured to selectively retain the transport dolly in place relative to the ground surface during operative use of the engine installation system to install the engine within the engine bay.

7. The engine installation system of claim 1, wherein the adapter cradle includes a lifting apparatus interface configured to be selectively and operatively coupled to a lifting apparatus and to receive a pivoting force from the lifting apparatus to pivot the adapter cradle relative to the transport dolly about the hinge fitting pivot axis while the adapter cradle is operatively coupled to the vehicle.

8. The engine installation system of claim 1, in combination with the engine.

9. A method of utilizing the engine installation system of claim 1, the method comprising:
positioning the engine beneath the engine bay;
subsequent to the positioning the engine beneath the engine bay, pivoting the engine relative to the vehicle; and
subsequent to the pivoting the engine relative to the vehicle, lifting the engine into the engine bay.

10. The method of claim 9, further comprising, prior to the positioning the engine beneath the engine bay, operatively coupling the engine to the adapter cradle of the engine installation system.

11. The method of claim 10, wherein the positioning the engine beneath the engine bay includes moving the transport dolly of the engine installation system along the ground surface to position the adapter cradle beneath the engine bay.

12. The method of claim 10, further comprising, prior to the pivoting the engine relative to the vehicle, operatively coupling the adapter cradle to the vehicle;
wherein the operatively coupling the adapter cradle to the vehicle includes operatively coupling each hinge fitting interface of the plurality of hinge fitting interfaces to a respective hinge fitting of the plurality of hinge fittings such that each hinge fitting interface of the plurality of hinge fitting interfaces is configured to pivot relative to the respective hinge fitting about the hinge fitting pivot axis.

13. The method of claim 10, wherein the pivoting the engine relative to the vehicle is performed while the engine is operatively coupled to the adapter cradle; and
wherein the pivoting the engine relative to the vehicle includes pivoting the adapter cradle relative to the vehicle about the hinge fitting pivot axis to transition the adapter cradle from the transport configuration to the upright configuration.

14. The method of claim 10, wherein the engine installation system further comprises a plurality of lifting rail assemblies configured to be selectively and operatively coupled to the adapter cradle to support the adapter cradle relative to the vehicle and to translate the adapter cradle into and out of the engine bay along a direction at least substantially parallel to a vertical direction; and wherein the lifting the engine into the engine bay includes vertically translating, with the plurality of lifting rail assemblies, the adapter cradle relative to the vehicle.

15. The method of claim 14, further comprising, subsequent to the pivoting the engine relative to the vehicle and prior to the lifting the engine into the engine bay, operatively coupling the adapter cradle to the plurality of lifting rail assemblies.

16. The method of claim 15, wherein the operatively coupling the adapter cradle to the plurality of lifting rail assemblies is performed while the adapter cradle is operatively coupled to the plurality of hinge fittings; and wherein the method further comprises, prior to the lifting the engine into the engine bay, uncoupling the adapter cradle from the plurality of hinge fittings.

17. The method of claim 10, further comprising, prior to the positioning the engine beneath the engine bay and while the adapter cradle is operatively coupled to the transport dolly of the engine installation system, operatively coupling the engine to the adapter cradle such that the engine is at least substantially fixed relative to the adapter cradle.

18. The method of claim 17, wherein the operatively coupling the engine to the adapter cradle is performed while the adapter cradle is in the upright configuration and while the engine is in an installation orientation; and wherein the method further comprises, subsequent to the operatively coupling the engine to the adapter cradle and prior to the positioning the engine beneath the engine bay, pivoting the adapter cradle relative to the transport dolly about the cradle pivot axis to transition the adapter cradle to the transport configuration and to transition the engine to a transport orientation.

19. The method of claim 10, further comprising:
(i) subsequent to the lifting the engine into the engine bay, longitudinally shifting the engine relative to the engine bay along a longitudinal axis of the engine; and
(ii) subsequent to the longitudinally shifting the engine relative to the engine bay, operatively installing the engine within the engine bay.

20. The engine installation system of claim 1, wherein the transport dolly includes a plurality of adapter cradle mounts; wherein the adapter cradle includes a corresponding plurality of dolly interfaces; and wherein each dolly interface of the plurality of dolly interfaces is configured to be selectively coupled to a corresponding adapter cradle mount of the plurality of adapter cradle mounts to pivotally couple the adapter cradle to the transport dolly.

21. The engine installation system of claim 20, wherein the plurality of adapter cradle mounts and the plurality of dolly interfaces each are distributed along the cradle pivot axis when the adapter cradle is operatively coupled to the transport dolly.

22. The engine installation system of claim 20, wherein each dolly interface of the plurality of dolly interfaces is configured to be selectively uncoupled from the corresponding adapter cradle mount to selectively uncouple the adapter cradle from the transport dolly.

23. The engine installation system of claim 20, wherein the transport dolly includes a plurality of adapter cradle lifting members configured to selectively adjust one or both of an orientation and a vertical height of the adapter cradle relative to the transport dolly when the adapter cradle is operatively coupled to the transport dolly.

24. The engine installation system of claim 23, wherein one or more of:
   (i) each adapter cradle mount of the plurality of adapter cradle mounts is operatively coupled to a corresponding adapter cradle lifting member of the plurality of adapter cradle lifting members;
   (ii) each adapter cradle lifting member of the plurality of adapter cradle lifting members includes a corresponding adapter cradle mount of the plurality of adapter cradle mounts; and
   (iii) each adapter cradle lifting member of the plurality of adapter cradle lifting members operatively supports the corresponding adapter cradle mount.

25. The engine installation system of claim 24, wherein each adapter cradle lifting member of the plurality of adapter cradle lifting members is configured to be independently transitioned among a plurality of vertical positions defined between and including a lowered position, in which the corresponding adapter cradle mount is proximal to the ground surface during operative use of the engine installation system, and a raised position, in which the corresponding adapter cradle mount is distal to the ground surface during operative use of the engine installation system.

26. The engine installation system of claim 23, wherein each adapter cradle lifting member of the plurality of adapter cradle lifting members is configured to be manually actuated.

27. The engine installation system of claim 23, wherein each adapter cradle lifting member of the plurality of adapter cradle lifting member includes a lifting member drive input configured to receive an input force and/or a torque for actuating the respective adapter cradle lifting member, and wherein the lifting member drive input includes, or is configured to receive the torque from, a crank.

\* \* \* \* \*